US012774926B2

(12) United States Patent
Foreman, Jr.

(10) Patent No.: US 12,774,926 B2
(45) Date of Patent: Oct. 27, 2026

(54) MODIFIED THERMOCOUPLE ASSEMBLY

(71) Applicant: Foreman Instrumentation & Controls, Inc., Houston, TX (US)

(72) Inventor: Timothy H. Foreman, Jr., Houston, TX (US)

(73) Assignee: Foreman Instrumentation & Controls, Inc., Houston, TX (US)

( * ) Notice: Subject to any disclaimer, the term of this patent is extended or adjusted under 35 U.S.C. 154(b) by 288 days.

(21) Appl. No.: 18/739,598

(22) Filed: Jun. 11, 2024

(65) Prior Publication Data

US 2025/0377246 A1 Dec. 11, 2025

Related U.S. Application Data

(63) Continuation of application No. 18/718,247, filed on Jun. 10, 2024.

(51) Int. Cl.

*G01K 7/04* (2006.01)
*G01K 1/02* (2021.01)
*G01K 1/024* (2021.01)
*G01K 7/13* (2006.01)

(52) U.S. Cl.

CPC ............... *G01K 7/04* (2013.01); *G01K 1/024* (2013.01); *G01K 1/026* (2013.01); *G01K 7/13* (2013.01)

(58) Field of Classification Search

CPC ........ G01K 7/004; G01K 1/024; G01K 1/026; G01K 7/13
USPC .......................................................... 374/179
See application file for complete search history.

(56) References Cited

U.S. PATENT DOCUMENTS

| | | | |
|---|---|---|---|
| 2,696,118 | A | 12/1954 | Petry |
| 3,053,091 | A | 9/1962 | Braunagel |
| 3,417,618 | A | 12/1968 | Morrisette |
| 3,921,453 | A | 11/1975 | Platzer, Jr. |
| 4,370,546 | A | 1/1983 | Warner |

(Continued)

FOREIGN PATENT DOCUMENTS

| | | | | |
|---|---|---|---|---|
| CA | 2693574 | A1 * | 4/2009 | ............... G01K 7/10 |
| EP | 2428780 | A2 * | 3/2012 | ............. G01K 7/023 |
| WO | WO 2008088433 | A1 | 7/2008 | |

OTHER PUBLICATIONS

International Search Report and Written Opinion for International Application No. PCT/US2023/034523 of Apr. 12, 2024.

*Primary Examiner* — Mirellys Jagan
(74) *Attorney, Agent, or Firm* — Stephen S. Hodgson

(57) ABSTRACT

A thermocouple assembly is provided that includes a type 1 thermocouple for indicating a temperature T; a transmitter configured to receive a voltage input from a type 2 thermocouple; and a thermocouple translator device (TTD) connected to the TMD and to the transmitter. The TTD determines a voltage that corresponds to the temperature T for the type 1 thermocouple and determines a voltage output VO from a type 2 thermocouple that corresponds to the temperature T. The TTD outputs the voltage output VO to the transmitter so that the transmitter can determine the temperature T as though an input was received from a type 2 thermocouple. The type 1 thermocouple may comprise expensive thermoelements while the type 2 thermocouple may comprise inexpensive thermoelements. The type 1 thermocouple can instead be any temperature measuring device.

15 Claims, 8 Drawing Sheets

(56) References Cited

U.S. PATENT DOCUMENTS

| | | | | |
|---|---|---|---|---|
| 4,590,326 | A | 5/1986 | Woldy et al. | |
| 5,735,605 | A * | 4/1998 | Blalock | G01K 7/13<br>374/E7.015 |
| 7,044,638 | B2 | 5/2006 | Phillips | |
| 7,234,864 | B2 | 6/2007 | Streicher | |
| 7,946,762 | B2 | 5/2011 | Yednak, III | |
| 8,485,724 | B2 | 7/2013 | Aberra | |
| 8,996,327 | B2 * | 3/2015 | Ge | G01K 1/20<br>374/166 |
| 9,279,731 | B2 * | 3/2016 | Egley | G01K 7/023 |
| 10,234,335 | B2 | 3/2019 | Hunter | |
| 10,996,113 | B2 | 5/2021 | Foreman, Jr. | |
| 2007/0268957 | A1 * | 11/2007 | Kovacevich | G01D 5/16<br>374/E1.021 |
| 2013/0163633 | A1 | 6/2013 | Liu et al. | |
| 2013/0343429 | A1 | 12/2013 | Kalteis et al. | |
| 2015/0131701 | A1 | 5/2015 | Hedayat | |
| 2016/0377489 | A1 | 12/2016 | Sin | |
| 2018/0238743 | A1 | 8/2018 | Rud et al. | |
| 2020/0173863 | A1 | 6/2020 | Gajdarus | |
| 2023/0028939 | A1 * | 1/2023 | Betts | H01R 13/6683 |

* cited by examiner

MODIFIED THERMOCOUPLE ASSEMBLY

CROSS REFERENCE TO RELATED APPLICATIONS

This application is a continuation of U.S. patent application Ser. No. 18/718,247 filed on Jun. 10, 2024, which is a national stage filing of International Patent Application No. PCT/US2023/034523 filed on Oct. 5, 2023, which claims priority to U.S. patent application Ser. No. 17/978,483 filed on Nov. 1, 2022, which is incorporated by reference.

BACKGROUND OF THE INVENTION

1. Field of the Invention

This invention relates generally to thermocouple assemblies, particularly to a modified thermocouple assembly in which different types of thermocouple elements are combined and additional temperatures can be obtained.

2. Description of the Prior Art

Thermocouples are widely used for temperature measurement of machines and processes in the chemical, petroleum, electronics, food, manufacturing and various other industries. Temperature measurement of chemical processes, for example, requires the placement of thermocouples in process units, such as columns, strippers, scrubbers, and reactors. To ensure reliable, efficient operation and process control, process unit temperature is continuously monitored using several thermocouples embedded at various locations within the process unit.

FIG. 1 provides an example of a basic and standard thermocouple assembly used in the prior art. Thermocouples TC1 and TC2 are provided for measuring temperatures T1 and T2, respectively. A pair of higher-grade thermoelements extends between each of TC1 and TC2 to a terminal block having a temperature T3. Lower-grade extension thermoelements connect the higher-grade thermoelements to a terminal block having a temperature T4. A transmitter or measuring instrument is connected to the T4 terminal block, which is used to measure the temperature T4 and voltage differences between the thermoelements connected to each of TC1 and TC2. Voltage differences are converted to temperature differences using standardized equations or charts for a particular type of thermoelement. Most of the temperature difference measured is typically between T1/T2 and T3. T4 is typically an ambient temperature at the transmitter or measuring instrument, and the temperature at T3 typically depends upon its location. The lower-grade extension thermoelements between T3 and T4 are typically made of a thermocouple wire or of thermoelement that produces an electromotive force (emf) response for voltage and temperature differences similar to that of the higher-grade thermoelements between T1/T2 and T3. Lower-grade extension thermoelements are typically lower cost and/or better suited for a particular operating environment. An extension-grade thermoelement will typically have a very similarly matched and equivalent voltage output versus temperature difference as a thermocouple-grade wire with which it is used. Both the lower-grade thermoelement combinations (extension grade) and the more accurate and expensive thermocouple grade are typically used for all types of thermocouples, and polynomial equations are published to represent their voltage output versus temperature difference. The extension grade wire is typically acceptable to use because a temperature difference (dT) across this region is relatively small, and its contribution to the overall temperature measurement is small. Therefore, the error produced from the lower grade wire is less relevant.

The higher-grade thermoelements that extend between each of TC1 and TC2 to the terminal block having the temperature T3 are labeled as TG5 and TG6 to imply thermocouple grade wire. The lower-grade extension thermoelements that extend from the terminal block having the temperature T3 to the terminal block having the temperature T4 are labeled as TE5 and TE6 to imply extension grade wire. The lower-grade extension thermoelements TE5 and TE6 are used in an embodiment of the present invention described with reference to FIG. 3. A type K thermocouple probe is used extensively in industry and is made when a nickel-chromium alloy wire is welded to a nickel-alumel alloy wire. Extension wire for a type K thermocouple has a lower purity specification than is used for the thermocouple probe. The nickel-chromium alloy wire may be considered a positive leg, and the nickel-alumel alloy wire may be considered a negative leg.

A temperature difference dT between T1/T2 and T4 can be determined by connecting a measuring instrument to the terminals at T4 and using standard equations or curves provided for the particular thermoelement combinations used between T1 and T4. Since only a dT measurement is produced, the measuring instrument measures its ambient temperature, which is called a cold junction temperature. In some applications, such as for industrial processes, the distance between T3 and T4 may be a very long distance (100s of meters), and the distance between T1/T2 and T3 may be a relatively short distance, probably less than one to a few meters. In applications for engines, these distances may be measured in centimeters. A problem arises where there is a need or desire to change the type of thermocouple used for measuring T1/T2, but it is impractical due to the necessity of replacing the lower-grade extension thermoelements between T3 and T4.

SUMMARY OF THE INVENTION

The present invention provides thermocouple assemblies, and one embodiment of a thermocouple assembly comprises: an isothermal terminal block A and a cold junction terminal block B; x pairs of thermoelements extending between blocks A and B, wherein each pair of thermoelements is capable of forming a thermocouple and comprises a positive leg and a negative leg, and wherein each positive leg and each negative leg is connected to a separate terminal in block B; a TCa thermocouple formed in block A with one pair of thermoelements, wherein each of the remaining legs is connected to a separate terminal in block A, wherein a first terminal in block A has a positive leg and a last terminal in block A has a negative leg or vice versa; (2x−2) TCz thermocouples for measuring or determining temperature in a temperature measurement zone, wherein the TCz thermocouples are formed by two dissimilar thermocouple wires that extend from the thermocouple TCa or from one of the terminals in block A, where the two dissimilar thermocouple wires comprise a positive and a negative thermocouple wire; and a smart multiplexer connected to each terminal in block B, where the multiplexer is configured to: obtain and use a cold junction temperature for block B; obtain and use a temperature at the TCa thermocouple; isolate a circuit for each of the TCz thermocouples; and determine or measure a temperature at each of the TCz thermocouples, preferably where two or more thermocouple wires are connected to each terminal in block A, except only one thermocouple wire is attached to each of the first and last terminals in block A, preferably where each of the temperatures at x number of the TCz thermocouples is determined or measured using a pair of either positive or negative legs of the thermoelements, preferably where each of the temperatures at (x−2) number of the TCz thermocouples is determined or measured using a positive and a negative thermoelement leg, preferably where the TCz thermocouples are type B, C, E, J, K, N, R, S or T, or preferably where the thermoelements are type K or N extension wire or compensating cable.

Another embodiment of the present invention is a method for measuring or determining temperatures comprising the steps of: placing an isothermal terminal block A between a cold junction terminal block B and a temperature measurement zone Z; extending x pairs of thermoelements TE between blocks A and B, where each pair of TE comprises a positive leg and a negative leg, and where each positive leg and each negative leg is attached to a separate terminal in block B; forming a thermocouple TCa in block A with one pair of TE; attaching each of the remaining legs to a separate terminal in block A, where a first terminal in block A has a positive leg and a last terminal in block A has a negative leg or vice versa; forming (2x−2) thermocouples in zone Z using two dissimilar thermocouple wires that extend from the thermocouple TCa or from one of the terminals in block A; connecting a smart multiplexer to each terminal in block B, wherein the multiplexer is configured to: obtain and use a cold junction temperature for block B; obtain and use a temperature measured by thermocouple TCa; isolate a circuit for each of the thermocouples in zone Z; and determine a temperature measured by each of the thermocouples in zone Z, preferably where two or more thermocouple wires are connected to each terminal in block A, except only one thermocouple wire is attached to each of first and last terminals in block A.

One embodiment of the present invention concerns changing or upgrading two related thermocouples, where one may be redundant to the other or both are measuring related temperatures. These old thermocouples are connected to an existing measuring instrument or transmitter using four existing thermoelements such as thermocouples wires, extension wires or compensation cable. The old thermocouples are replaced with new first and second thermocouples of a different type than the old thermocouples, such as replacing an existing type K thermocouple with a new type N thermocouple. It is not necessary for the new first thermocouple to be the same type as the new second thermocouple. A new terminal block is installed, which preferably does not require a power source. Two existing wires or thermoelements that have different compositions of matter are connected to a terminal in the new terminal block, thereby forming a new thermocouple junction to measure and provide a new temperature in the new terminal block, which is preferably an isothermal terminal block. The other two existing thermoelements are connected to separate and independent terminals in the new terminal block. A thermocouple wire from each of the new first and second thermocouples is connected to the new thermocouple junction. The other thermocouple wire from each of the new first and second thermocouples is connected to the separate and independent terminals in the new terminal block such that these other thermocouple wires are not in contact with one another. The existing wires or thermoelements terminate on terminals in an existing terminal block, and an existing measuring instrument and/or transmitter is connected to the existing terminal block, which will preferably continue to be used. However, a new calculating and switching device, preferably a multiplexer, is operatively connected to existing terminal block with connections to the existing terminals. The existing transmitter continues to provide a cold junction temperature at the existing terminal block, which can be used with a voltage difference between the thermoelements connected to the new thermocouple junction to indicate the temperature at the new thermocouple junction. The calculating and switching device is designed and configured to measure a voltage difference between terminals in the existing terminal block that are related to the first new thermocouple while terminals related to the second new thermocouple are not connected together so that the second new thermocouple does not interfere with determining a temperature at the first new thermocouple. The voltage difference between terminals in the existing terminal block that are related to the first new thermocouple along with the cold junction temperature in the existing terminal block and the temperature at the new thermocouple junction are used to determine the temperature at the first new thermocouple. The temperature at the second new thermocouple is determined in a like manner by opening and closing circuits using the terminals in the existing terminal block.

The present invention with respect to changing or upgrading two related thermocouples can be described as follows. Another embodiment of the present invention that allows one to change the type of thermocouple used to measure or indicate a temperature can be described as a thermocouple assembly that comprises first and second thermocouples of the same type or different types; thermocouple wires extending from the first and second thermocouples to a first block; a third thermocouple in the first block, wherein a leg from each of the first and second thermocouples is connected to the third thermocouple, and wherein the other leg from each of the first and second thermocouples is connected to first and second separate and independent terminals, respectively, in the first block; a second block; first and second extension wires joined together at one end to form the third thermocouple and extending to separate and independent terminals in the second block, wherein the first and second extension wires do not have the same thermo-electric properties as the thermocouple wires; third and fourth extension wires connecting the first and second terminals, respectively, in the first block to separate and independent terminals in the second block; and equipment operatively connected to the second block and/or to the terminals in the second block that is designed and configured to measure, determine and/or estimate a temperature at each of the first, second and third thermocouples.

The equipment is preferably designed and configured to determine temperatures at the first and second blocks, and where the equipment is preferably designed and configured to determine a temperature at the first thermocouple using a voltage difference between terminals at the second block that receive the first and third extension wires while no circuit is made using the terminals at the second block that receive the second and fourth extension wires. The equipment is also preferably designed and configured to determine a temperature at the second thermocouple using a voltage difference between terminals at the second block that receive the second and fourth extension wires while no circuit is made using the terminals at the second block that receive the first and third extension wires.

The equipment preferably includes a measuring instrument transmitter and a switching and calculating device, such as a multiplexer, which are used to determine temperatures at the first and second blocks. The extension wires and the thermocouples wires can be different metal compositions, and the extension wires do not need to be suitable for use as extensions of the thermocouple wires. For example, the first and second thermocouples can be type N and the extension wires can be type K extension wire, which allows one to replace a type K thermocouple with a type N thermocouple. If more temperature measurements are needed, then two or more additional thermocouples are preferably employed, where a leg from each of a pair of additional thermocouples is connected to a new thermocouple that is formed at the junction of extension cables that run from the new thermocouple to separate and independent terminals at the second block. It is not necessary for the new thermocouple to be located in the first block, which allows a new temperature measurement to be made.

Another embodiment of the present invention is a thermocouple assembly that comprises thermocouples TC1 and TC2 to TCn for measuring temperatures T1 and T2 through Tn, respectively, where TC1 is formed at a junction of thermoelements TE1 and TE2, where TC1 is a Type12 thermocouple, where TC2 is formed at a junction of thermoelements TE3 and TE4, where TC2 is a Type34 thermocouple, where each of the thermocouples from TC2 to TCn is made in a manner similar to TC1 and TC2, and where the thermocouples TC1 and TC2 to TCn can be the same or different or a variety of types of thermocouples; proximal and distal isothermal blocks with respect to TC1 and TC2; a thermocouple TCp formed at a junction of thermoelements TE5 and TE6 and located in the proximal block, where thermocouple TCp is a Type56 thermocouple, where thermoelements TE5 and TE6 terminate at terminals TRM1 and TRM2 in the distal block, respectively, where thermoelement TE2 from TC1 and thermoelement TE3 from TC2 are connected to thermocouple TCp.

This embodiment includes a total of n−1 thermocouple junctions including the junction for thermocouple TCp between one or more temperature measurement zones and the distal block, where a thermoelement from one of the thermocouples and a thermoelement from another one of the thermocouples between the thermocouples TC2 and TCn is connected to each of the thermocouple junctions between the one or more temperature measurement zones and the distal block, where each of the n−1 thermocouple junctions is formed by a pair of compensated thermoelements, where each strand in a pair of compensated thermoelements extends from its respective thermocouple junction in or associated with the proximal block to a separate and independent terminal in the distal block, where a thermoelement from TC1 is connected to a terminal TRM3 in the proximal block, and where a thermoelement used to make the thermocouple junction TCn is connected to a terminal TRM4 in the proximal block; a strand of a first thermoelement extends between terminal TRM3 and a terminal TRM5 in the distal block; and a strand of a second thermoelement extends between terminal TRM4 in the proximal block and a terminal TRMn in the distal block.

Equipment comprising a multiplexer is operatively connected to the terminals in the distal block for making and breaking circuits within the thermocouple assembly and a transmitter or measuring instrument determines an ambient or cold junction temperature at the distal block and outputs temperature indications or measurements, which can be transmitted to a control center. The multiplexer is configured to form circuits from each of the thermocouples TC1 and TC2 to TCn to terminals in the distal block, where the circuit comprises a pair of compensated thermoelements that form their respective thermocouple and extend from the respective thermocouple to separate terminals or thermocouples in or associated with the proximal block, and where the circuit further comprises a pair of uncompensated thermoelements that extend from said separate terminals or thermocouples in the proximal block to separate and independent terminals in the distal block. Each of these circuits is formed for a thermocouple without interference from another thermocouple. Each circuit comprises a pair of compensated thermoelements from a thermocouple to terminals or a thermocouple in the proximal block or associated with the proximal block and a pair of uncompensated thermoelements, extension wires or cables that extend from said terminals or thermocouple in or associated with the proximal block to terminals in the distal block. The multiplexer makes and breaks connections using the terminals in the distal block to form these individual circuits, which are used by the multiplexer and/or the transmitter or measuring instrument to determine or estimate a temperatures for each of T1 and T2 through Tn.

One embodiment of the present invention provides a thermocouple assembly and a method for changing, generally upgrading, one or more thermocouples to a different type while continuing to use existing extension wires, compensation cables, measuring instruments and/or transmitters. For changing or upgrading a single thermocouple connected to a measuring instrument or a transmitter, one replaces the existing thermocouple with a new thermocouple of a different type and runs new thermocouple wires from the new thermocouple to a new terminal block. The new terminal block includes a digital or analog processor of some type that is designed and configured to receive a new voltage difference from the new thermocouple wires and to correlate the new voltage difference to a temperature T measured by the new thermocouple. Using standardized equations or charts, the processor correlates the temperature T to an old voltage difference between old thermocouple wires from the replaced thermocouple and outputs this old voltage difference to existing thermocouple wires or extension wires that are connected to the existing measuring instrument or transmitter, which uses the old voltage difference to indicate the temperature T.

This case of changing or upgrading a single thermocouple connected to a measuring instrument or a transmitter can be described as follows. One embodiment of the present invention that allows one to change the type of thermocouple used to measure or indicate a temperature can be described as a thermocouple assembly that comprises a type 1 thermocouple for indicating a temperature T; a thermocouple translator device (TTD); type 1 thermocouple wires connecting the type 1 thermocouple to the TTD; a type 2 measuring instrument; and type 2 thermocouple wires or type 2 extension wires connecting the TTD to the type 2 measuring instrument, where type 1 and type 2 indicate different types of thermocouple material, and where the TTD is designed and configured to: measure a voltage difference VD1 at the TTD between the type 1 thermocouple wires; determine or estimate the temperature T for a type 1 thermocouple; determine or estimate a voltage difference VD2 for a type 2 thermocouple for the determined or estimated temperature T; and output the voltage difference VD2 to the type 2 thermocouple wire or type 2 extension wire, thereby providing an input to the type 2 measuring instrument that can be used for determining and/or indicating the temperature T.

In addition to the thermocouple translator device (TTD) described above, a number of other thermocouple assemblies and apparatuses can be made that incorporate the present invention. A thermowell-thermocouple assembly can be made and used that incorporates the thermocouple assembly of the present invention. A multipoint thermocouple assembly in which multiple thermocouples pass through and are pressure sealed with a flange can incorporate the thermocouple assembly of the present invention, thereby allowing more temperature measurements than the number of thermocouples that pass through the flange.

BRIEF DESCRIPTION OF THE DRAWINGS

By way of illustration and not limitation, the invention is described in detail hereinafter on the basis of the embodiments represented in the accompanying figures, in which.

DETAILED DESCRIPTION OF THE PREFERRED EMBODIMENTS

Figure 2:
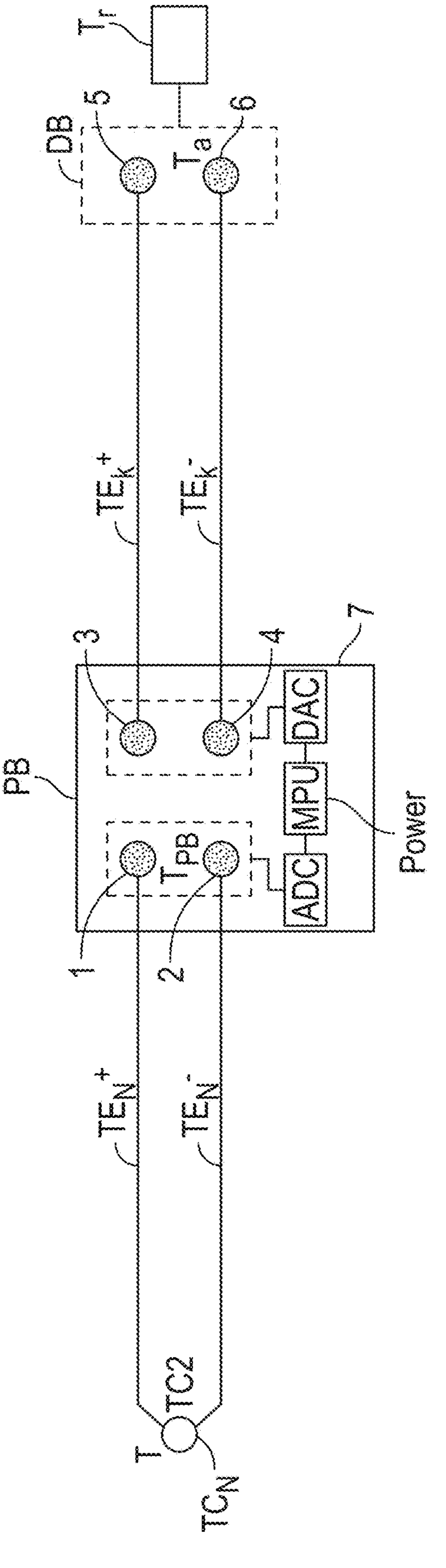
FIG. 2 is a schematic diagram of a thermocouple assembly in which a first type of thermocouple for measuring a temperature has been changed to a second type, while continuing to use extension thermoelements for the first type, according to the present invention.

FIG. 2 is a schematic diagram of a thermocouple assembly in which a first type of thermocouple has been changed to a second type of thermocouple. For example, a Type K thermocouple has been changed to a Type N thermocouple. In this example, a thermocouple $TC_N$ is a Type N thermocouple, and it is used to measure a temperature T. However, the temperature T was originally measured using a Type K thermocouple, and there is a long length of lower-grade Type K extension thermoelements $TE_{K+}$ and $TE_{K-}$ that extends from a proximal terminal block PB to a distal terminal block DB. It is considered economically impractical to change out the lower-grade Type K extension thermoelements $TE_{K+}$ and $TE_{K-}$ to Type N extension thermoelements in this example, but it is desirable to change to a Type N thermocouple for measuring the temperature T. The distance from the thermocouple $TC_N$ to the proximal block PB is considered short, while the distance from the proximal block PB to the distal block DB is considered very long. The Type N thermocouple $TC_N$ has replaced a previous Type K thermocouple (not shown), and Type N thermoelements $TE_{N+}$ and $TE_{N-}$ extend from the Type N thermocouple $TC_N$ to terminals 1 and 2 in the proximal block PB, respectively. The Type K extension thermoelements $TE_{K+}$ and $TE_{K-}$ are attached to terminals 3 and 4 in the proximal block PB, respectively.

In some applications, it is not possible to change a type of thermocouple without changing an existing measuring instrument, which may not be practical. For example, a thermocouple might be connected directly to a measuring instrument with no extension wires, and the measuring instrument may only be capable of reading a Type K thermocouple, but there is a need to change the thermocouple to a Type N. The present invention allows one to change the thermocouple from a Type K to a Type N while continuing to use the measuring instrument that is only capable of reading a Type K thermocouple.

A microprocessor unit MPU is installed in the proximal block PB, and leads from the terminals 1 and 2 are routed into the microprocessor unit MPU. The MPU measures a temperature $T_{PB}$ in the proximal block PB; measures a voltage difference V12 between terminals 1 and 2; and determines or estimates the temperature T using the temperature $T_{PB}$, the voltage difference V12 and standardized tables or polynomial equations provided by the American Society for Testing and Materials (ASTM). The MPU is programmed to determine a voltage difference V34 that corresponds to the temperature T for a Type K thermocouple and to then output the voltage difference V34 to the terminals 3 and 4. The Type K extension thermoelements $TE_{K+}$ and $TE_{K-}$ extend between the terminals 3 and 4 to terminals 5 and 6 in the distal block DB, respectively.

The microprocessor unit MPU should have appropriate circuity to accurately measure the required input signals and to produce output signals. The front end of the electronics in the MPU may be analog input circuitry (an amplifier circuit) with an analog-to-digital converter ADC, and the back end of the electronics may be analog output circuitry that includes a digital-to-analog converter DAC. While all of the processing can be done using analog circuitry, calculations and configuration will be easier using a digital processor between the front and back analog portions.

A transmitter (or measuring device, or controller, or indicator) Tr is operatively connected to detect a voltage difference V56 between terminals 5 and 6. There is a voltage difference V34 between terminals 3 and 4. There may be a temperature difference between the proximal block PB and the distal block DB, which contributes a voltage difference Vpd to the voltage difference V56. The voltage difference V56 is the sum of the voltage difference V34 and the voltage difference Vpd. The transmitter Tr measures its local, ambient temperature Ta and uses the ambient temperature Ta, the voltage difference V56 and standardized tables or polynomial equations provided by the ASTM for a Type K thermocouple to output a determination or an estimate of the temperature T. The ambient temperature Ta is used to properly place a voltage difference on a correct spot of a curve showing a relationship between voltage difference and temperature. The curve may not be perfectly linear. The ambient temperature at the measuring instrument is used to then find a correct voltage-difference-and-temperature relationship between curves for two different thermocouples and to output a translated voltage difference based on the same temperature difference dT. This is not an absolute temperature and is instead a temperature difference. For all TC measurements, the dT measured should be added to the cold junction temperature T4 (TCJ) at the measuring device. The dT measured plus TCJ is equal to the absolute temperature.

A method is thus provided for changing a type of thermocouple in a thermocouple assembly having a Type 1 thermocouple for determining a value for a measured temperature Tm, a Type 1 measuring instrument or transmitter and Type 1 thermoelements, extension wire and/or compensation cable extending between the Type 1 thermocouple and the Type 1 measuring instrument. One replaces the Type 1 thermocouple with a Type 2 thermocouple, where Type 1 and Type 2 mean any two different types of thermocouples. The Type 1 thermocouple was used previously to indicate the measured temperature Tm, and now the Type 2 thermocouple will be used to determine or estimate the measured temperature Tm. A thermocouple translator device TTD, such as a digital processor, is installed between the measured temperature Tm and the measuring instrument. Type 2 thermoelements are connected between the Type 2 thermocouple and the TTD. A voltage difference VD2 is measured at and by the TTD, and the TTD is programmed to determine or estimate the measured temperature Tm for a Type 2 thermocouple. The TTD is programmed to determine or estimate a voltage difference VD1 for a Type 1 thermocouple for the determined or estimated measured temperature Tm at the TTD. The TTD is programmed to have standardized tables or polynomial equations provided by the ASTM for correlating a voltage difference to a temperature for Type 1 and Type 2 thermocouples. The TTD is programmed to output the calculated voltage difference VD1 to the Type 1 thermoelements, extension wire and/or compensation cable using the voltage difference VD2 and an ambient local reference temperature Tr at the Type 1 measuring instrument as inputs. The same instrument that is measuring the TC input of the Type 2 will typically also measure a local cold junction temperature. The measurement is typically done with a thermistor, which is simple to add to most modern electronics and will provide a reasonably accurate absolute temperature reading. The Type 1 measuring instrument or transmitter is operatively connected to the Type 1 thermoelements, extension wire and/or compensation cable and reads the voltage difference VD1 as being from the original Type 1 thermocouple. The Type 1 measuring instrument or transmitter is programmed to have standardized tables or polynomial equations provided by the ASTM for correlating the voltage difference VD1 to a temperature T1 using the local reference temperature Tr at the Type 1 measuring instrument. The Type 1 measuring instrument or transmitter determines or estimates the measured temperature Tm as T1 plus Tr. With respect to replacing the Type 1 thermocouple with a Type 2 thermocouple, an alternative is to replace the Type 1 thermocouple with a resistance temperature detector (RTD), a thermistor, an infrared pyrometer, a value from an infrared camera, a value from an infrared camera array or a calculated temperature based on a known correlation to temperature. With reference to FIG. 2, the digital processor DP determines a temperature using the output from the alternative temperature device; calculates a proper voltage output for that temperature for the Type 1 measuring instrument or transmitter.

FIG. 2 illustrates a thermocouple assembly that comprises a temperature measuring device (TMD) selected from a group consisting of a type 1 thermocouple, a resistance temperature detector (RTD), a thermistor, an infrared pyrometer and an infrared camera, wherein the TMD is designed and configured to measure or indicate a temperature T; a thermocouple translator device (TTD) operatively connected to the TMD, wherein the TMD outputs a voltage to the TTD that corresponds to the temperature T; and a measuring instrument or transmitter that is designed and configured to receive an input from a type 2 thermocouple and to indicate the temperature T. The TTD is operatively connected to the measuring instrument or transmitter and is designed and configured to: determine or estimate the temperature T based on the input from the TMD; calculate or determine a voltage output VO from a type 2 thermocouple that corresponds to the temperature T; and input the voltage output VO to the measuring instrument or transmitter so that the measuring instrument or transmitter can calculate, measure and/or indicate the temperature T as though an input was received from a type 2 thermocouple. The type 1 and type 2 thermocouples may or may not comprise different compositions of matter. The type 1 and type 2 thermocouples can be type B, C, E, J, K, N, R, S or T thermocouples.

With reference to FIG. 2, a thermocouple translator device (TTD) for use in a temperature measurement system is claimed, which comprises: an enclosure 7; first and second terminals 1 and 2 on or in the enclosure 7, wherein the first and second terminals 1 and 2 are configured to receive first and second thermoelements extending between a thermocouple and the enclosure; third and fourth terminals 3 and 4 on or in the enclosure, wherein the third and fourth terminals 3 and 4 are configured to receive third and fourth thermoelements extending between a temperature measuring instrument Tr and the enclosure 7; a connector received on and/or in the enclosure, wherein the connector is configured for receiving power from a power source; and a digital and/or analog processor received on or in the container and operatively connected to the connector and to the first, second, third and fourth terminals, wherein the processor is configured to: measure a voltage difference VD1 between the first and second terminals; determine or estimate a temperature T for a type 1 thermocouple that correlates to the voltage difference VD1; determine or estimate a voltage difference VD2 for a type 2 thermocouple for the temperature T, wherein a type 2 thermocouple is not the same as a type 1 thermocouple; and output third and fourth voltages to the third and fourth terminals, respectively, wherein a difference in voltage between the third and fourth voltages is approximately equal to the voltage difference VD2.

The processor is preferably a microprocessing unit MPU, and the TTD preferably further comprises an analog-to-digital converter ADC for receiving the voltage difference VD1 and outputting a first signal to the microprocessing unit MPU and a digital-to-analog converter DAC for receiving a second signal from the MPU and outputting the voltage difference VD2. The TTD preferably further comprises a power source, which can be an energy harvester for providing power. The energy harvester can be a solar panel for providing power, preferably with a rechargeable battery for storing energy from the solar panel. Energy can be harvested from the thermocouples. It may be possible to convert heat energy to electrical energy in some applications.

The processor is configured for the type 1 thermocouple to be a type N thermocouple and for the type 2 thermocouple to be a type K thermocouple in one embodiment. The processor is configured for the type 1 thermocouple to be a type B, R or S thermocouple and for the type 2 thermocouple to be a type K or N thermocouple in a second embodiment. The processor is configured for the type 1 thermocouple to be a length of cable having two different thermocouple wires separated by an insulator, wherein one end of both thermocouple wires is attached to the first terminal, wherein the opposing end of both thermocouple wires is attached to the second terminal, and wherein the cable is configured to indicate a maximum temperature detected along its length in a third embodiment. The processor is configured for a plurality of types of thermocouples in a fourth embodiment and preferably further comprises a selector that allows a user to indicate a type of thermocouple wire attached to each of the terminals. Regarding the length of cable having two different thermocouple wires separated by an insulator, see U.S. Pat. Nos. 4,647,710 and 4,491,822, issued to Davis, for details about this type of thermocouple wire.

The enclosure 7 is preferably a box that can be opened and shut and sealed. The enclosure 7 is a permanent encasement in another embodiment, such as a sealed plastic container that contains electronics for performing the functions of the TTD and has terminals for receiving thermocouple wires. The enclosure 7 may have the shape of a cylinder configured to fit in a thermocouple head. The enclosure 7 may have a rectangular shape and be configured for receipt on a DIN rail. In another embodiment, the enclosure 7 is a simple terminal block that has the electronics described above mounted in or on the terminal block, or the electronics can be a separate unit connected to the terminal block. The terminals 1, 2, 3 and 4 are preferably screw terminals.

With further reference to FIG. 2, a kit is claimed that comprises the thermocouple translator device (TTD) described above and the thermocouple TC2, the thermoelements TE$_{N+}$ and T$_{EN-}$ and TE$_{K+}$ and TE$_{K-}$ and the distal block DB with its terminals 5 and 6 and preferably also the transmitter Tr.

Figure 3:
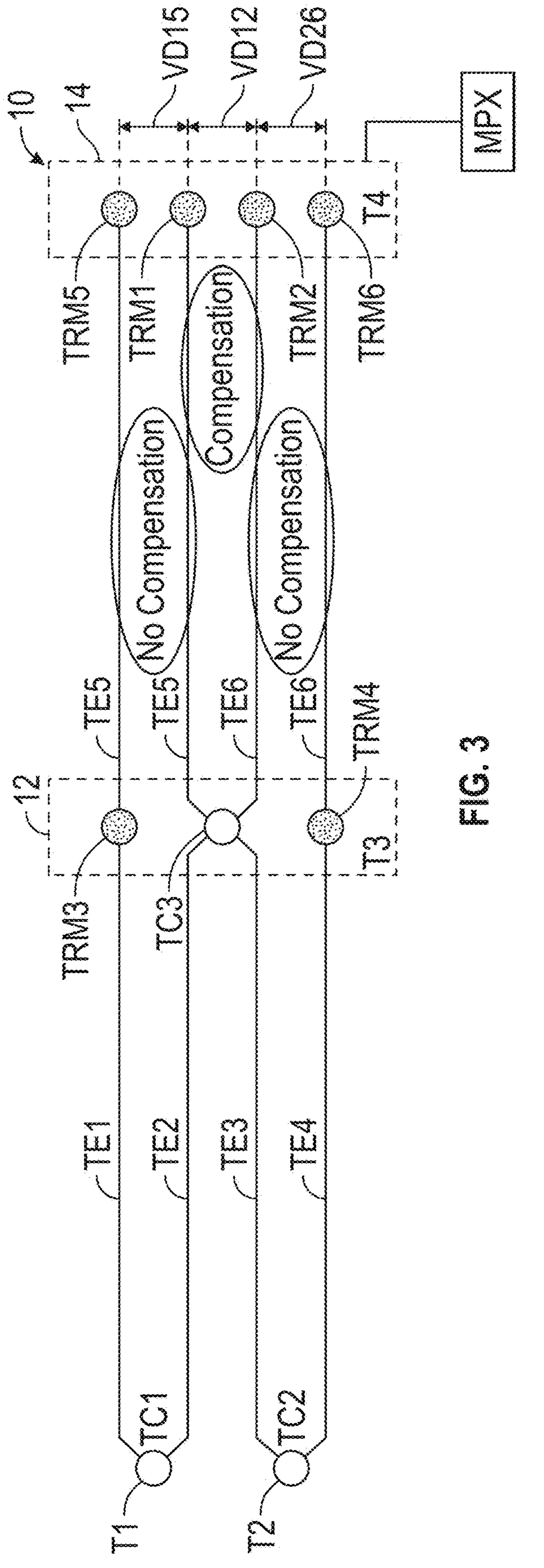
FIG. 3 is a schematic diagram of a thermocouple assembly in which two thermocouples for measuring two temperatures have been changed to another type of thermocouple, while continuing to use extension thermoelements for the first type, according to the present invention.

FIG. 3 is a schematic diagram of a thermocouple assembly 10 for determining temperatures T1 and T2 in a hot or cold zone or in two different hot or cold zones. T1 and T2 can measure the same or different temperatures and can be installed in the same or different locations. Thermocouple assembly 10 includes thermocouples TC1 and TC2 for measuring or determining temperatures T1 and T2, respectively. Thermocouple TC1 is formed at a junction of thermoelements TE1 and TE2, and TC1 is a Type12 thermocouple. TC2 is formed at a junction of thermoelements TE3 and TE4, and TC2 is a Type34 thermocouple. Thermocouples TC1 and TC2 can be the same or different types of thermocouples. TE1 (positive) and TE2 (negative) are different compositions of materials and may be different compositions of noble metals, which are generally considered expensive. Thermocouple types are identified by letters such as B, C, E, J, K, N, R, S and T. Thermocouple types are identified herein by numbers to imply that any type of thermocouple suitable for a particular application can be used according to the present invention. The temperatures T1 and T2 are described herein as being hot temperatures typically encountered in industrial processes, turbines and engines, but the present invention is also applicable for cold temperatures such as encountered in cryogenic processes.

Thermocouple assembly 10 includes proximal 12 and distal 14 terminal blocks, where the proximal terminal block 12 is considered reasonably close to the thermocouples TC1 and TC2, and the distal terminal block 14 is considered somewhat far away from the thermocouples TC1 and TC2. The proximal 12 and distal 14 terminal blocks are preferably isothermal blocks at temperatures of T3 and T4, respectively, where isothermal means the terminals within a block should be at the same temperature although that temperature may change from time to time. A thermocouple TC3 is in the proximal terminal block 12 and is formed at a junction of thermoelements TE5 and TE6. Thermocouple TC3 is a Type56 thermocouple. Thermoelement TE5 is not necessarily an extension thermoelement that is considered compatible with thermoelement TE1 of the Type12 thermocouple used to determine the temperature T1. Thermoelement TE6 is not necessarily an extension thermoelement that is considered compatible with the thermoelement TE3 in the Type34 thermocouple used to determine the temperature T2. Thermoelement TE5 extends from thermocouple TC3 to a terminal TRM1 in the distal terminal block 14. Thermoelement TE6 extends from thermocouple TC3 to a terminal TRM2 in the distal terminal block 14. Thermoelements TE5 and TE6 comprise different compositions of material so that a voltage difference VD12 can be measured between terminals TRM1 and TRM2 for use in determining the temperature T3 at the proximal terminal block 12. The different compositions of material for thermoelements TE5 and TE6 provides compensation between TE5 and TE6.

Thermoelement TE2 extends from thermocouple TC1 to thermocouple TC3 and is connected to thermocouple TC3. Thermoelement TE3 extends from thermocouple TC2 to thermocouple TC3 and is connected to thermocouple TC3. Thermoelements TE2 and TE3 are normally, but not necessarily, different compositions of matter. Thermoelement TE1 extends from thermocouple TC1 to a terminal TRM3 in the proximal block 12. Thermoelement TE4 extends from thermocouple TC2 to a terminal TRM4 in the proximal block 12. A strand of the thermoelement TE5 extends between terminal TRM3 and a terminal TRM5 in the distal block 14, and a strand of the thermoelement TE6 extends between terminal TRM4 and a terminal TRM6 in the distal block 14. It is important to note that the composition of the thermoelement TE5 between terminal TRM3 in the proximal block 12 to the terminal TRM5 in the distal block 14 is the same as the composition of the thermoelement TE5 between thermocouple TC3 in the proximal block 12 and terminal TRM1 in the distal block 14. Consequently, no temperature difference between temperature T3 and temperature T4 can be detected by a voltage difference between the terminals TRM5 and TRM1 because no compensation is provided between the proximal block 12 and the distal block 14 for the thermoelements TE5 connected to the terminals TRM5 and TRM1. The same is true for the thermoelement TE6 that extends from both the thermocouple TC3 and the terminal TRM4 in the proximal block 12 to the terminals TRM2 and TRM6 in the distal block 14, respectively. There is no voltage difference between terminals TRM2 and TRM6 in the distal block 14 due to a temperature difference between temperature T3 in the proximal block 12 and temperature T4 in the distal block 14 because no compensation is provided between the proximal block 12 and the distal block 14 for the thermoelements TE6 connected to the terminals TRM2 and TRM6.

With reference to FIG. 3, the thermocouple assembly 10 is used to determine or estimate the temperatures T1 and T2 as follows. A measuring instrument or a transmitter (not shown) is used to determine the temperature T4 at the distal block 14, which is generally an ambient temperature. The measuring instrument or a transmitter measures the voltage difference VD12 between the terminals TRM1 and TRM2 and then uses the voltage difference VD12, the temperature T4 at the distal block 14 and standard specification and temperature-electromotive force (emf) tables for standardized thermocouples or polynomial equations such as provided in ASTM E230 to determine or estimate the temperature T3 in the proximal block 12 for a Type56 thermocouple. For a further explanation as to how the temperature T3 is determined, see, for example, U.S. Pat. No. 7,044,638 issued to Phillips and assigned to Rosemount Aerospace, Inc., which is incorporated by reference. The term "Type56 thermocouple" is not intended to be an actual standard type of thermocouple and is instead intended to be a generic reference to a preferred type of thermocouple for a particular application. The same is true for thermocouple Type12 and Type34, as this terminology is intended as a generic reference to any thermocouple type that is suitable for a particular application. For example, the Type56 thermocouple TC3 may actually be a Type K thermocouple, and the Type12 and the Type34 thermocouples TC1 and TC2, respectively, may actually be a Type N thermocouple.

The temperature T3 in the proximal block 12 can be used as a reference temperature for determining or estimating the temperatures T1 and T2 in the hot zone. The measuring instrument or a transmitter, which is not shown in the drawings, is preferably programmed to measure a voltage difference VD15 between the terminals TRM1 and TRM5 in the distal block 14. There is no voltage difference between terminals TRM1 and TRM5 that is attributable to a temperature difference between T3 at the proximal block 12 and the temperature T4 at the distal block 14 because the same thermoelement TE5 is used between the thermocouple TC3 and terminal TRM1 and between the terminal TRM3 in the proximal block 12 and the terminal TRM5 in the distal block 14. Temperature compensation, in the form of a voltage difference, can only be obtained for a difference in temperature when different thermoelements are paired together across the zones of differing temperature. The voltage difference generated between the two dissimilar thermoelements correlates to the temperature difference. Therefore, when thermoelements of similar materials are used across a temperature difference each thermoelement produces the same voltage difference and their sum difference is zero or no compensation or uncompensated. A simple example of uncompensated thermoelements is two copper wires or copper vs. copper.

A voltage difference exists between terminals TRM1 and TRM5, which is attributable to a temperature difference between the temperature T1 in the hot zone and the temperature T3 in the proximal block 12. A temperature difference that corresponds to the voltage difference VD15 can be determined by the measuring instrument or transmitter using the standardized tables or polynomial equations provided by the American Society for Testing and Materials (ASTM). The temperature difference that corresponds to the voltage difference VD15 is the difference in temperature between the temperature T1 in the hot zone and the temperature T3 in the proximal block 12 for a Type12 thermocouple. It is considered a Type12 thermocouple because the thermoelements TE1 and TE2 provide the temperature-electromotive force between terminals TRM1 and TRM5, since the same thermoelement TE5 is used between thermocouple TC3 and terminal TRM1 and between terminal TRM3 and terminal TRM5. The temperature T1 in the hot zone can be determined or estimated as the difference in temperature between the temperature T1 in the hot zone and the temperature T3 in the proximal block 12 plus the temperature T3.

The temperature T2 is determined or estimated similarly. A voltage difference VD26 is measured between terminals TRM2 and TRM6 in the distal block 14, which is attributable to a temperature difference between T2 in the hot zone and T3 in the proximal block. A temperature difference that corresponds to the voltage difference VD26 can be determined by the measuring instrument or transmitter using the standardized tables or polynomial equations provided by the ASTM for a Type34 thermocouple. The temperature T2 is determined or estimated as the temperature difference that corresponds to the voltage difference VD26, which is the difference between T2 and T3. This difference between T2 and T3 plus the temperature T3 provides a determination or an estimation of the temperature T2 in the hot zone. This is simply (T2−T3)+T3=T2 The temperature T3 in the proximal block 12 effectively provides a cold junction temperature or reference temperature for determining the temperature T2 in the hot zone. No temperature difference is measured between the temperature T3 in the proximal block 12 and the temperature T4 in the distal block 14 because the same thermoelement TE6 extends between the proximal block 12 and the terminals TRM2 and TRM6 in the distal block 14.

The measuring instrument should be capable of making independent differential measurements between the various terminal (thermoelement) pairs without causing interference between the instrument or between the different measurements (other pair reading to be measured). This is typically accomplished by isolating the differential pairs to be measured and only reading from those two elements. A multiplexer configuration, in either a mechanical relay form or in a solid-state multiplexer form, is one method that can successfully accomplish such isolated readings. A solid-state multiplexer MPX is shown in FIG. 3. With this setup and for simplicity, only two terminal connections will be activated (connection closed) at a time. This allows the needed differential mV measurement to be taken, and then the multiplexer is cycled to the next reading pair option. For the example of FIG. 3, there are 4 lines (thermoelements/terminals) that must be measured in various differential pair configurations to obtain all of the needed readings. These are labeled TRM5, TRM1, TRM2, and TRM6. To measure the output formed by TC3 along the dT from T3 to T4 and with TE5 and TE6, the multiplexer would position connections TRM1 and TRM2 closed (connection made) and TRM5 and TRM6 open (no connection). Since the mV from a thermoelement (in this case TE5 or TE6) is generated along the thermogradient of the conductive thermoelement, then only the voltage provided at TRM1 versus at TRM2 will be from the dT from T3 to T4 from TE5 and TE6, respectively. All other thermoelements in FIG. 3 are outside of the measured pair (loop) and will not contribute to the reading. TC3 creates a "dead short" and "zeros out" the legs on the other side that are "floating" or not connected to anything and are outside a measured loop. It is not an absolute requirement to only take one reading at a time. In some configurations, measuring equipment types, and operating conditions, it may be possible to take multiple readings simultaneously. Possible examples might include long high impedance wire runs, very high-quality electronics and proximity. A measuring instrument should preferably be able to isolate any set of connections to measure, but it should have the option to measure more than one set of connection at a time and/or have more than one set of connection activated (relay closed) at a time. When this would or would not work depends on the exact configuration. The full multiplexer on one set at a time should work for all conditions and configurations.

One measures the output formed by T1 along the dT from T1 to T3 and with TE1+TE5 and TE2+TE5 using connections to and measuring a voltage difference VD15 between TRM1 and TRM5. The contributing output from both legs labeled TE5 between the proximal block 12 and the distal block 14 can be ignored since this is a differential reading and their contribution will be the same and opposing and will therefore cancel out, meaning "No Compensation." The multiplexer should switch connections TRM2 and TRM6 open (no connection) and TRM5 and TRM1 closed (connection made). The differential voltage reading VD15 measured from TRM5 and TRM1 will represent the TC1 output from T1 to T3. All other thermoelements (TE3, TE4, TE6) are floating, meaning outside a measured loop, and will not contribute to or interfere with the measurement.

Similarly, one measures the output formed by T2 along the dT from T2 to T3 and with TE4+TE6 and TE3+TE6 using connections to and measuring a voltage difference between TRM2 and TRM6. The contributing output from both legs labeled TE6 can be ignored since this is a differential reading and their contribution will be the same and opposing and will therefore cancel out. There is no compensation between the thermoelements labeled TE6 in FIG. 3. The multiplexer should switch connections TRM2 and TRM6 closed (connection made) and TRM5 and TRM1 open (no connection). The differential voltage reading VD26 measured from TRM2 and TRM6 will represent the TC2 output from T2 to T3. All other thermoelements (TE1, TE2, TE5) are floating or outside a measured loop and will not contribute to or interfere with the measurement. It should be noted that one pair at the middle terminal junction 12 should not be connected and therefore not form an additional middle junction thermocouple. This is represented in FIG. 3 with TRM3 and TRM4 not being connected together to form an additional thermocouple as was done to form TC3. This feature allows the system to be switched to positions that isolate readings for each of TC1, TC2, and TC3.

Figure 1:
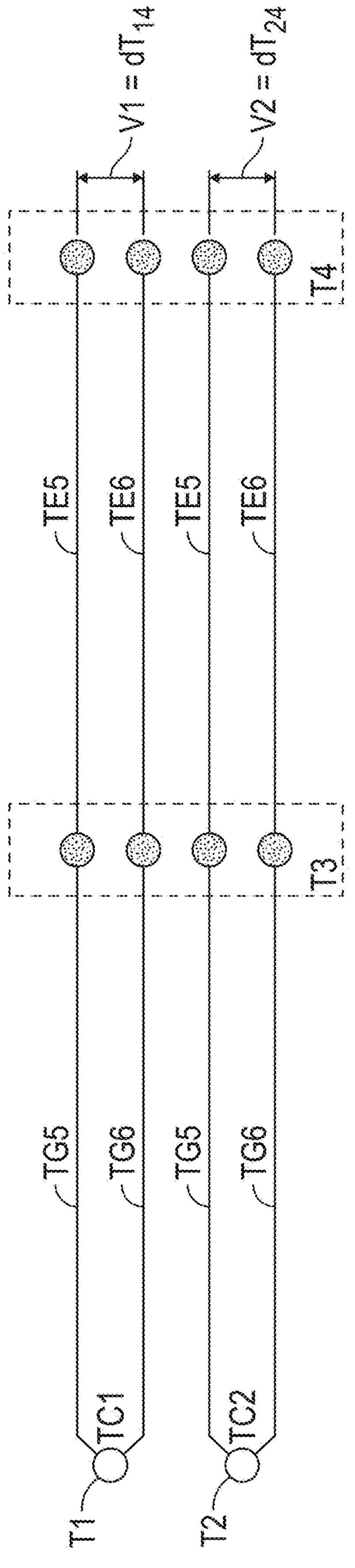
FIG. 1 (PRIOR ART)
FIG. 1 is a schematic diagram of a thermocouple assembly, according to the prior art.

One possible use for the embodiment in FIG. 3 is in an application where there is more than one thermocouple and extension wires (at least two as shown in FIG. 3) and the existing thermocouple types are the same. One wishes to change to a different type of thermocouple, but it is desired that the extension (compensation) wire for the system not be changed, which could be due to simplicity, cost, impracticality or some other reason. As an example, a process flare within a chemical plant, a refinery or in oil and gas operations is very common and typically requires multiple thermocouples for monitoring whether the flare is operating properly. Two Type K thermocouples have typically been used to monitor the flare along with sets of Type K extension/compensation wire (KX wire). The configuration is similar to FIG. 1, which consists of TC1 and TC2, which would be positioned to monitor the flare at T1 and T2, respectively. T3 would represent a terminal block at the other end of the thermocouple and is typically located within a thermocouple head (a small junction box), which allows a connection to the extension wires that connect T3 to T4. The terminal block is typically located away from the heat of the flare measured at T1/T2, but is still relatively close to the flare/flame. Typically, the distance from T3 to T4 would be a much greater and the wiring of the Type K extension/compensation wire (KX wire) would be difficult and expensive to replace if the user wants to make a change in the thermocouple type used to monitor the flare.

The present invention allows one to change the Type K thermocouples to an alternate thermocouple type while still using the existing Type K (KX) extension/compensation wiring. The embodiment of the present invention described with reference to FIG. 3 illustrates how two thermocouples adjacent to a flare flame can be changed to a different type of thermocouple while continuing to use existing extension/compensation wiring. In this example, the Type K thermocouple can be changed to a Type N thermocouple (TC1 with TE1/TE2 and TC2 with TE3/4), and an additional thermocouple would be formed at a terminal block (T3). The existing Type K (KX) extension/compensation wiring would continue to be used (TE5, TE5, TE6, TE6). Other possibilities include first and second thermocouples and thermoelements that are type B, R or S and thermoelements, extension wires or compensation cable that are type K or type N.

A new or reconfigured measuring instrument would be required at T4 to properly take the required measurements and perform the needed calculations. The new or reconfigured measuring instrument would likely include a multiplexer. The benefits of this configuration allows one to change thermocouple types in an existing system without changing the extension wire and without providing additional electronics at the transition point between the flare flame thermocouples and the extension wire, such as at the terminal block 12 in FIG. 3. The location of the terminal block near the flare flame would likely be unsuitable for electronics and would require a power source, which may not be readily available at the location. The electronics, including the multiplexer, would be located at the distal block 14 in FIG. 3, which is typically a more accommodating location, which is cooler and more accessible and has power available.

If there are more than two thermocouples, then the thermocouples should be addressed in sets of two. This is needed so the system will maintain the needed like pairs (same thermoelement types) for no compensation between the T3 to T4 blocks. If there are 5 TCs and 2 of TCa and 3 of TCb, then this system will still work, but the odd TC (the third of TCb) should maintain its TC compensation type from Tb3 (hot/T1) to T3 to T4. The odd TC should work as a standard TC with compensation cable, and all others (even numbered/paired) will work as described with reference to FIG. 3.

Figure 4:
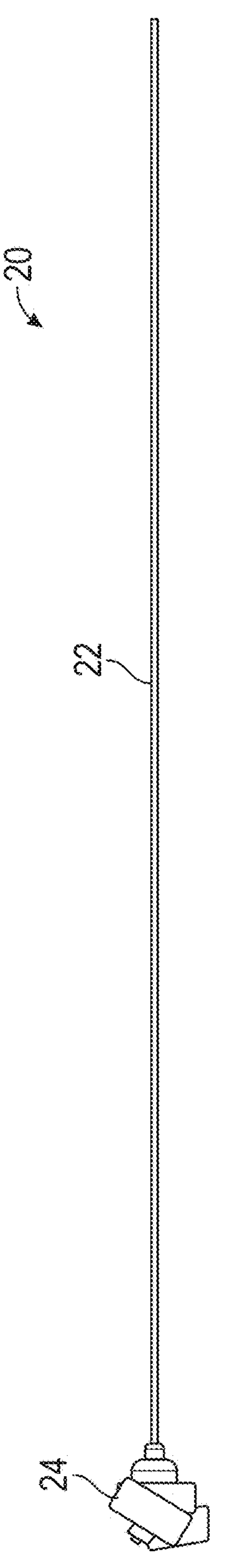
FIG. 4 is a side elevation of a thermocouple assembly, according to the present invention.

FIG. 4 is a side elevation of a thermocouple assembly 20 comprising an eleongated dual element thermocouple 22 in a protective sheath and a thermocouple head 24 received on an end of the dual element thermocouple 22. Thermocouple head 24 is typically made of cast iron for withstanding heat near a burning flare. The dual element thermocouple 22 has two thermocouples, which have typically been type K thermocouples. A long run of extension wire connects the thermocouples to a transmitter. The present invention allows one to make the thermocouple assembly 20 with a different type of thermocouple wire, such as type N, while continuing to use the long run of extension wire.

With reference to FIGS. 3 and 4, a product that can be made and sold is a kit that comprises a first terminal block 12 having a terminal TRM3, a terminal TRM4 and a thermocouple TC3 for measuring a temperature T3, a second terminal block 14 having terminals TRM1, TRM2, TRM5 and TRM6; and a smart multiplexer MPX operatively connected to each of the terminals TRM1, TRM2, TRM5 and TRM6, wherein the smart multiplexer MPX is configured to isolate desired pairs of the terminals and to measure a voltage difference between the terminals in a desired pair, and wherein the smart multiplexer is configured to determine a temperature that correlates to the measured voltage difference for user-specified thermoelements received on or in the terminals; and instructions informing a user to:

connect terminal TRM3 in the first terminal block to terminal TRM5 in the second terminal block using a thermoelement having a composition of matter A, connect thermocouple TC3 in the first terminal block to terminal TRM1 in the second terminal block using a thermoelement having the composition of matter A, connect thermocouple TC3 in the first terminal block to terminal TRM2 in the second terminal block using a thermoelement having a composition of matter B, wherein composition of matter B is not the same as composition of matter A, and connect terminal TRM4 in the first terminal block to terminal TRM6 in the second terminal block using a thermoelement having the composition of matter B.

The multiplexer is preferably configured to: isolate terminals TRM1 and TRM 5 in the second terminal block while measuring a voltage difference between terminals TRM1 and TRM5 to determine a voltage difference VD15, isolate terminals TRM1 and TRM2 in the second terminal block while measuring a voltage difference between terminals TRM1 and TRM2 to determine a voltage difference VD12, and isolate terminals TRM2 and TRM6 in the second terminal block while measuring a voltage difference between terminals TRM2 and TRM6 to determine a voltage difference VD26. The multiplexer is preferably configured to determine the temperature T3 at the thermocouple TC3 using the voltage difference VD12.

The instructions preferably inform the user to: connect one lead from a thermocouple TC1 to terminal TRM3 in the first terminal block and the other lead from thermocouple TC1 to thermocouple TC3; and to connect one lead from a thermocouple TC2 to terminal TRM4 in the first terminal block and the other lead from thermocouple TC2 to thermocouple TC3, wherein thermocouple TC1 is for determining a temperature T1, and wherein thermocouple TC2 is for determining a temperature T2.

The smart multiplexer is preferably configured to determine the temperature T1 using the voltage difference VD15 and the temperature T3 and the temperature T2 using the voltage difference VD26 and the temperature T3. The kit may use an alternative identification system for identifying the terminals and/or the thermocouples.

The product kit described above with reference to FIGS. 3 and 4 is configured in one embodiment for measuring the temperature at a flare tip for confirming that a gas pilot is burning. The smart multiplexer MPX and the second terminal block 14 are preferably combined into a single unit, which may be called a smart thermocouple head, preferably with connectors for receiving power. The smart thermocouple head would replace an existing thermocouple head, measuring instrument or transmitter, which is typically located at ground level. The instructions preferably indicate that the first terminal block 12 should be located near the flare tip, but spaced sufficiently away from a burning flare so as to not become damaged by heat from burning flare gas. One option is to locate the first terminal block 12 in the thermocouple head 24 and to extend a desired set of thermocouple wires from the thermocouple head 24 to the opposing end of the dual element thermocouple 22, while using existing extension wire from the thermocouple head 24 to the second terminal block 14. Another option is to locate the first terminal block 12 away from but near the thermocouple head 24 and to extend a desired set of thermocouple wires from the first terminal block 12 to and through the thermocouple head 24 and to the opposing and distant end of the dual element thermocouple 22, while using existing extension wire from the first terminal block 12 to the second terminal block 14. One example of a desired set of thermocouple wires for monitoring a pilot flame for a flare is type N thermocouple wire.

The present invention is useful in applications other than the flare tip application described above. Thermocouples are widely used for temperature measurement of machines and processes in the chemical, petroleum, electronics, food, manufacturing and various other industries. Temperature measurement of chemical processes, for example, requires the placement of thermocouples in process units, such as columns, strippers, scrubbers, and reactors. To ensure reliable, efficient operation and process control, process unit temperature is continuously monitored using several thermocouples embedded at various locations within the process unit. Each thermocouple is typically mounted into the wall of the process unit by threading or otherwise securing the thermocouple through a mounting flange or similar measurement port. The thermocouple secured through a mounting flange may be protected on the process unit interior by a thermowell, which is attached to the internal side of the measurement port and acts to shield the thermocouple from harsh process conditions. Alternatively, the thermocouple may be protected by an integrated thermocouple assembly or armor, where the thermocouple wires are encased within an inner protection tube, an inner filler material, and outer sheath or sheaths, all constructed of various chemical compositions.

Figure 5:
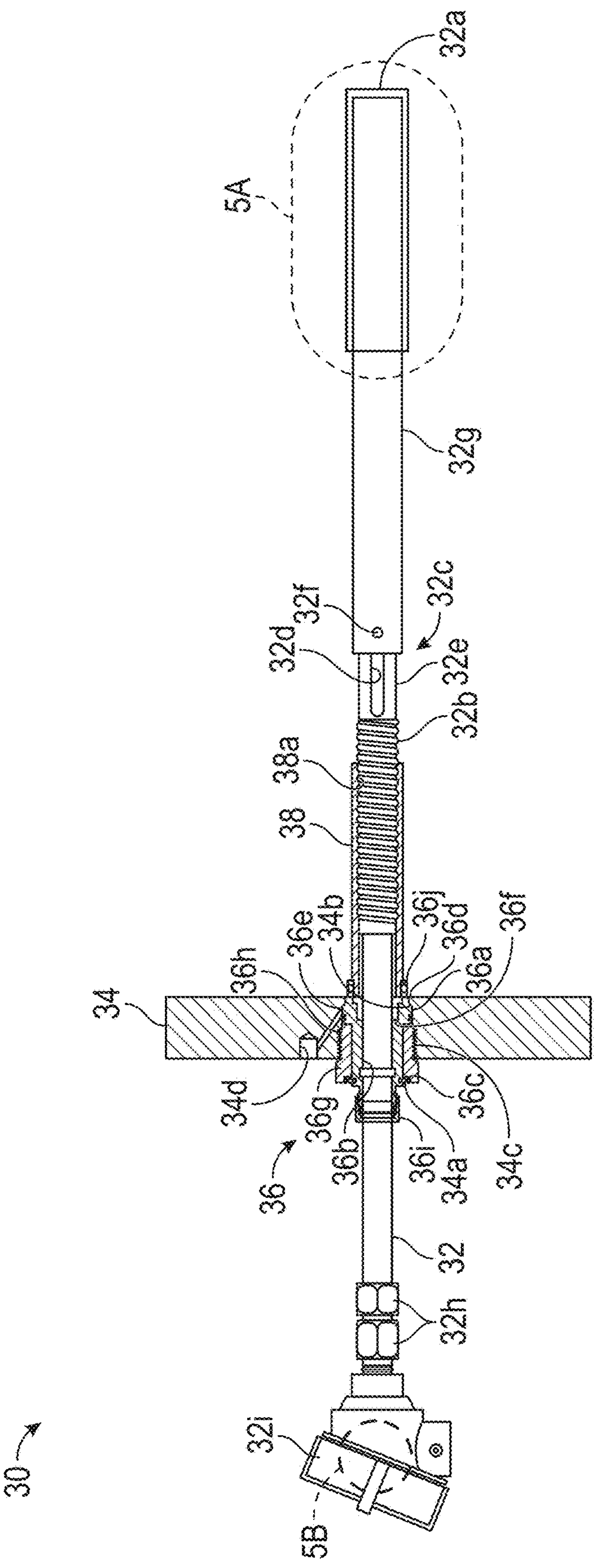
FIG. 5 is a side elevation in partial cross-section of a thermowell assembly that incorporates a thermocouple assembly, according to the present invention.

A thermowell is a hollow tube in which a thermocouple is mounted and serves to protect the thermocouple from the environment in which it is placed to measure temperature. A thermowell is used as a protective sheath around a thermocouple in installations where harsh process conditions are encountered. FIG. 5 is a side elevation view partially in cross-section of a thermowell mounting system 30 that includes a thermowell-thermocouple assembly 32, which is fastened into a flange 34. The thermowell-thermocouple assembly 32 has a distal end **32*a* that will be placed inside a process vessel, a pipe, a machine or another apparatus in which temperature is to be measured. The flange 34 will be bolted to and sealed against a similar flange. The present inventor's U.S. patent application Ser. No. 18/125,253 (the '253 application) filed on Mar. 23, 2023, which is incorporated by reference, discloses a flange-and-fitting assembly that is preferably used in this application for fastening the thermowell-thermocouple assembly 32 in the flange 34. A conical seal fitting (CSF) 36 comprises an inner tubular sealing portion 36*a* that has a longitudinal bore 36*b* between a proximal end 36*c* and a distal end 36*d*, an exterior conical sealing surface 36*e* near the distal end 36*d* and an exterior shoulder 36*f* between the proximal end 36*c* and the exterior conical sealing surface 36*e*. Flange 34 has a through-hole 34*a* defined by an interior conical sealing surface 34*b* and interior threads 34*c*. A gland nut 36*g* surrounds the inner tubular sealing portion 36*a* and has exterior threads 36*h* that engage the interior threads 34*c* of the flange 34. The gland nut 36*g* presses against the exterior shoulder 36*f* to push the exterior conical sealing surface 36*e* of CSF 36 against the interior conical sealing surface 34*b* of the flange 34, thereby providing a metal-to-meatal seal that can be tightened by screwing the gland nut 36*g* into the interior threads 34*c* of the flange 34. The CSF 36 has an O-ring received in a groove and a trapped annular space is defined between the O-ring and the metal-to-meatal seal. Flange 34 has a test port 34*d* extending from outside of a vessel into the annular space. The annular space can be pressurized through the test port 34*d* to test the seal. Thermowell-thermocouple assembly 32 is received in the conical seal fitting (CSF) 36. A nut 36*i* is threadedly engaged with the inner tubular sealing portion 36***a* to press one or two ferrules onto the thermowell-thermocouple assembly 32 for sealing the thermowell-thermocouple assembly 32 with the conical seal fitting (CSF) 36 and thereby with the flange 34.

With further reference to FIG. 5, the present inventor's U.S. Pat. No. 7,465,086, which is incorporated by reference, describes an adjustable-length thermowell and a mounting system that allows a thermocouple-thermowell assembly to be easily adjusted in length to achieve a proper position within a machine or process unit for accurate temperature measurement. The adjustable-length thermowell-thermocouple assembly can be installed at a desired depth in a process unit and then fixed in position at that depth. A length-adjustment tube 38 is fastened directly or indirectly to the flange 34. Length-adjustment tube 38 can have exterior threads that engage the interior threads 34*c* of the flange or can be welded to flange 34 for a direct connection to flange 34. FIG. 5 shows an indirect connection. The conical seal fitting 36 has a hollow cylinder 36*j* that extends into the machine, structure or vessel beyond the flange 34. The hollow cylinder 36*j* has three threads holes spaced evenly around its circumference. A proximal end of length-adjustment tube 38 is received in the hollow cylinder 36*j*, and screws are received in the threaded holes in the hollow cylinder 36*j* and pressed against the length-adjustment tube 38 for indirectly fastening the length-adjustment tube 38 to the flange 34.

Length-adjustment tube 38 has interior threads 38*a*. The thermocouple-thermowell assembly 32 is received in and passes through the length-adjustment tube 38. The thermocouple-thermowell assembly 32 has raised exterior threads 32*b* that are matingly received in the interior threads 38*a* in the length-adjustment tube 38. Rotation of the thermowell-thermocouple assembly 32 with respect to the length-adjustment tube 38 changes the distance between the flange 34 and the distal end 32*a* of the thermowell-thermocouple assembly 32, thereby adjusting the length of the thermowell-thermocouple assembly 32 within a process vessel on which the flange 34 is installed. See U.S. Pat. No. 7,465,086 for more details about length-adjustment. The thermowell-thermocouple assembly 32 is preferably configured to pass through the hole 34*a* in the flange 34 and through the length-adjustment tube 38, except that the exterior threads 32*b* are raised beyond the external diameter of the thermowell-thermocouple assembly 32 so that the exterior threads 32*b* engage the interior threads 38*a* in the length-adjustment tube 38. Conical seal fitting 36 is preferably fastened to flange 34 before thermowell-thermocouple assembly 32 is rotated to extend into a desired depth in a vessel. After the depth of the thermowell-thermocouple assembly 32 is at a desired point in the vessel, nut 36*i* is engaged with exterior threads on the conical seal fitting 36 and tightened, which causes the ferrules to seal the thermowell-thermocouple assembly 32 with the fitting 36, thereby providing a tube seal around the thermowell-thermocouple assembly 32. The conical seal fitting 36 and the length-adjustment features described above are optional features. A thermowell-thermocouple assembly that does not have length-adjustment features can be received in the flange 34 of FIG. 5 in a conventional threaded arrangement.

A process unit or a machine that is subject to a wide range of temperature will cause a thermocouple-thermowell assembly to expand and contract as the temperature changes. Also, vessels that operate at very high temperatures are lined on the inside with fire brick and/or refractory material, which can be many times thicker than the wall of the vessel. The thermocouple-thermowell assembly needs to pass through the wall of the vessel and through the thickness of the firebrick and/or refractory material. The firebrick and/or refractory material expands, contracts and moves during operation, particularly during changes in temperature, which can subject a thermocouple-thermowell assembly to various forces, which often causes a thermocouple to fail and no longer provide a reliable temperature measurement. In a process such as coal gasification, a molten slag flows within a vessel and penetrates into openings in the fire brick and/or refractory and hardens, thereby fixing or fastening a thermocouple-thermowell assembly to the fire brick and/or refractory, which subjects the assembly to any movement of the fire brick/refractory lining. A need existed for a thermowell-thermocouple assembly that can withstand harsh process conditions and forces upon it due to expansion, contraction and physical movement, and this need was typically addressed by using a strong, rigid thermowell-thermocouple assembly.

The present inventor's U.S. Pat. No. 10,996,113, which is incorporated by reference, discloses a thermowell-thermocouple assembly that has an expansion joint for accommodating and tolerating various forces exerted on the assembly, such as the forces that cause expansion and contraction due to changes in temperature and forces that are transverse to the longitudinal axis of the thermowell-thermocouple assembly.

With reference to FIG. 5, thermowell-thermocouple assembly 32 preferably has an expansion joint 32*c* for accommodating and tolerating the various forces exerted on the assembly. The thermowell-thermocouple assembly 32 and its expansion joint 32*c* are described in the U.S. Pat. No. 10,996,113 patent. Expansion joint 32*c* is an optional feature, but is preferred for some end-use applications such as described in the U.S. Pat. No. 10,996,113 patent. The expansion joint 32*c* illustrated in FIG. 5 uses a pin-and-slot mechanism, preferably with a spring. Expansion joint 32*c* includes a longitudinal slot 32*d* in a first tube 32*e* and a pin 32*f*. Pin 32*e* is in threaded engagement with a second tube 32*g* and extends into the longitudinal slot 32*d* in the first tube 32*e*. There are preferably three pins or screws, one for each of preferably three slots spaced evenly around the circumference of the first tube 32*e*, but only one slot 140*a* and one pin or screw 140*b* are shown in this cross-section. A spring is preferably received inside second tube 32*g*, which pushes the distal end 32*a* of the thermowell-thermocouple assembly 32 away from the flange 34. Examples of expansion joints include unsupported bellows, bellows that have a support sleeve around the bellows, a sliding, hexagonal coupling with crimping to hold the sliding tubes together, a pin-and-slot coupling and a spring-loaded, pin-and-slot sliding connection, each of which is described in the U.S. Pat. No. 10,996,113 patent. Expansion joint 32*c* in FIG. 5 is a spring-loaded, pin-and-slot sliding connection. The adjustable length thermowell tube described in the U.S. Pat. No. 7,465,086 patent, the flexible thermowell tube described in the U.S. Pat. No. 10,996,113 patent or a standard thermowell can be used as the thermowell-thermocouple assembly 32. The thermowell-thermocouple assembly 32 has thermocouple wire inside the tube that is shown. A thermocouple wire seal 32*h* seals the thermocouple assembly inside thermowell-thermocouple assembly 32 and provides a connection to a thermocouple head 32*i* from which the thermocouple assembly can transmit temperature measurement data.

Figure 5A:
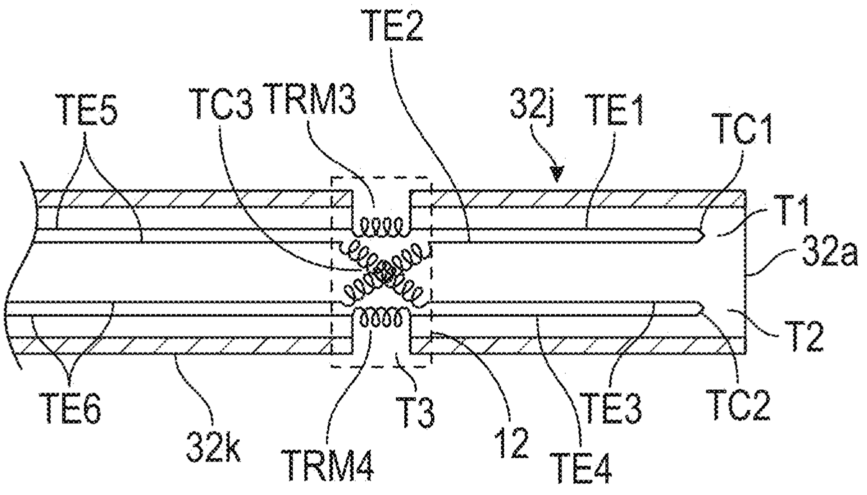
FIG. 5A is an exploded view of a portion of the thermowell assembly of FIG. 5, which illustrates a replaceable thermowell-thermocouple tip.

FIG. 3 was described above as a schematic diagram of a thermocouple assembly in which two thermocouples for measuring two temperatures are changed to another type of thermocouple, while continuing to use extension thermoelements for the first type. The thermocouple assembly of FIG. 3 can be implemented in the thermowell-thermocouple assembly 32 of FIG. 5 as follows. FIG. 5A is an exploded view of a distal end portion of the thermowell-thermocouple assembly 32 of FIG. 5 disassembled. Element numbers in FIG. 5A are the same element numbers that are used for FIG. 3.

With reference to FIGS. 3, 5, 5A and 5B, one embodiment of the present invention is a thermowell-thermocouple assembly 32 for measuring temperature inside a structure, wherein the structure comprises a commercial or industrial vessel, unit or machine, and wherein the structure has a mounting flange 34 for receiving and holding the thermowell-thermocouple assembly, the thermowell-thermocouple assembly 32 comprising: a thermowell tube received in and engaged directly or indirectly with the mounting flange, wherein the thermowell tube has a distal end 32*a* for receipt inside the structure and a proximal end that remains outside the structure; a thermocouple head 32*i* received on the proximal end of the thermowell tube, wherein the thermocouple head 32*i* comprises the terminal block 14 of FIG. 3, which has terminals; a smart multiplexer MPX connected to the terminals in terminal block 14; and a thermocouple assembly received in the thermowell tube.

The thermocouple assembly comprises: a thermocouple tip 32*j* having a first thermocouple (TC1) for determining a first temperature (T1) and a second thermocouple (TC2) for determining a second temperature (T2), wherein the first thermocouple (TC1) is formed at a junction of first and second thermoelements (TE1 and TE2), wherein the second thermocouple (TC2) is formed at a junction of third and fourth thermoelements (TE3 and TE4); a terminal block (12); a third thermocouple (TC3) on or in the terminal block (12) for determining a third temperature (T3), wherein the third thermocouple (TC3) is formed at a junction of fifth and sixth thermoelements (TE5 and TE6), wherein the fifth thermoelement (TE5) extends from the third thermocouple (TC3) to a first terminal (TRM1) in the terminal block (14), wherein the sixth thermoelement (TE6) extends from the third thermocouple (TC3) to a second terminal (TRM2) in the terminal block (14), wherein the second thermoelement (TE2) extends from the first thermocouple (TC1) to the third thermocouple (TC3), wherein the third thermoelement (TE3) extends from the second thermocouple (TC2) to the third thermocouple (TC3), wherein the first thermoelement (TE1) extends from the first thermocouple (TC1) to a third terminal (TRM3) in the terminal block (12), wherein the fourth thermoelement (TE4) extends from the second thermocouple (TC2) to a fourth terminal (TRM4) in the terminal block (12), wherein a strand of fifth thermoelement material (TE5) extends from the third terminal (TRM3) in the terminal block (12) to a fifth terminal (TRM5) in the terminal block (14), and wherein a strand of sixth thermoelement material (TE6) extends from the fourth terminal (TRM4) in the terminal block (12) to a sixth terminal (TRM6) in the terminal block (14).

Figure 5B:
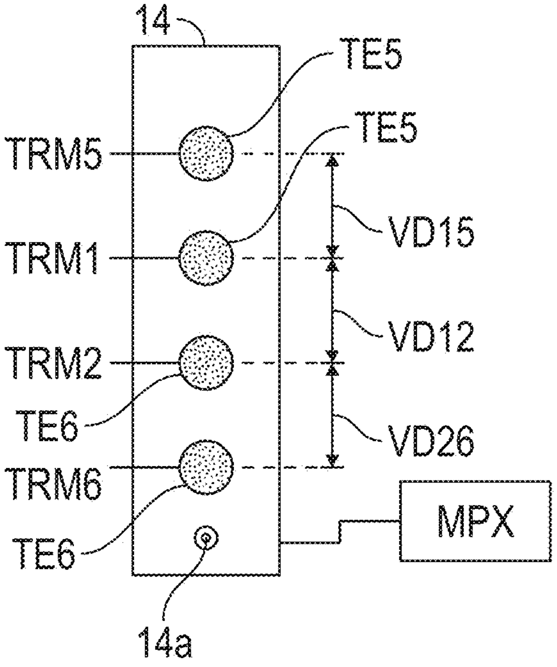
FIG. 5B illustrates an isothermal terminal block used in the thermowell-thermocouple assembly of FIG. 5 and a connection to a multiplexer.

The smart multiplexer MPX shown in FIG. 5B is preferably configured to: determine a reference temperature (T4) at the terminal block (14), such as by using a thermistor 14*a*; measure a voltage difference (VD12) between the first and second terminals (TRM1 and TRM2); determine or estimate the third temperature (T3) using the voltage difference (VD12) between the first and second terminals (TRM1 and TRM2) and the reference temperature (T4) at the thermocouple head (14); measure a voltage difference (VD15) between the first and fifth terminals (TRM1 and TRM5); determine or estimate the first temperature (T1) using the voltage difference (VD15) between the first and fifth terminals (TRM1 and TRM5) and the third temperature (T3) at the terminal block (12); measure a voltage difference (VD26) between the second and sixth terminals (TRM2 and TRM6); and determine or estimate the second temperature (T2) using the voltage difference (VD26) between the second and sixth terminals (TRM2 and TRM6) and the third temperature (T3) at the terminal block (12). The thermoelements preferably comprise thermocouple wire.

The voltage difference between two terminals is determined while those two terminals are isolated from other terminals for avoiding an interference from a different circuit. The smart multiplexer preferably includes memory for storing tables of data and/or polynomial equations that can be used to correlate a voltage difference to a temperature for a specified thermocouple. In one embodiment the thermowell-thermocouple assembly 32 and the terminal block (12) are designed and configured to allow the thermocouple tip 32*j* to be removed and replaced. Terminal block (12) is shown in FIG. 5A to have strands of thermocouple wire twisted together to make the described connections, where the connections are proximal to one another so as to be in an isothermal zone. A strand of TE5 is twisted together with a strand of TE1 and is labeled as terminal TRM3. A strand of TE6 is twisted together with a strand of TE3 and is labeled as terminal TRM4. Strands of TE5 and TE6, which form thermocouple TC3, are twisted together with a strand of TE2 that extends to thermocouple TC1 and with a strand of TE3 that extends to thermocouple TC2. Terminal block 12 can be filled with an insulating ceramic material to electrically separate terminals TRM3 and TRM4 from thermocouple TC3. In any case, the terminal block (12) should be an isothermal zone within the thermowell-thermocouple assembly 32. The tip 32*j* of the thermowell can be cut off and replaced, or an appropriate connector can be used that can be taken apart and put back together. This aspect of the present invention provides a replaceable distal portion 32*j* of the thermowell-thermocouple assembly 32. An example of a connector assembly is a key and slot mechanism for the replaceable distal portion 32*j* to engage an adjacent portion 32*k* of the thermowell-thermocouple assembly 32. Set screws could be used to fasten the distal portion 32*j* to the adjacent portion 32*k*. The distal portion can be configured to have raised exterior threads, and an end cap having interior threads can slide over the distal portion 32*j*, where the interior threads in the end cap engage the raised exterior threads on the adjacent portion 32*k*, and where the end cap is sized and configured to press the replaceable distal portion 32*j* into engagement with the adjacent portion 32*k*. The threaded engagement of the end cap with the adjacent portion 32*k* can be slightly loose to accommodate forces on the end cap that tends to move the end cap with respect to the flange 34, thereby providing an expansion joint.

The third terminal (TRM3) in the terminal block (12) preferably comprises a connection between the first thermoelement (TE1) and the strand of fifth thermoelement material (TE5). The fourth terminal (TRM4) in the terminal block (12) preferably comprises a connection between the fourth thermoelement (TE4) and the strand of sixth thermoelement material (TE6). The first, second, third and fourth thermoelements are type C, G, S, R or B thermocouple wire in one embodiment. The fifth and sixth thermoelements are type N, K, E, J or T thermocouple wire in a preferred embodiment.

In a preferred embodiment, the thermowell-thermocouple assembly 32 preferably further comprises a length-adjustment element preferably comprising a hollow tubular mounting fitting configured for receipt in the mounting flange, wherein the mounting fitting has internal threads, wherein the thermowell tube has external threads that engage the internal threads, wherein the termowell tube has a length between the mounting flange and the proximal end of the thermowell tube, and wherein rotation of the thermowell tube changes the length. The thermowell tube has a distal portion in a preferred embodiment that is received inside the structure and an expansion joint in the distal portion, where the expansion joint is configured to allow the distal portion of the thermowell tube to move with respect to the mounting fitting while the structure is in operation. The thermowell-thermocouple assembly 32 preferably further comprising a conical seal fitting for engaging the thermowell tube with the mounting flange.

With reference to FIGS. 3, 5, 5A and 5B, the thermocouple assembly in the thermowell-thermocouple assembly 32 preferably comprises: a thermocouple tip having a first thermocouple (TC1) for determining a first temperature (T1) and a second thermocouple (TC2) for determining a second temperature (T2), wherein the first thermocouple (TC1) is formed at a junction of first and second thermoelements (TE1 and TE2), wherein the second thermocouple (TC2) is formed at a junction of third and fourth thermoelements (TE3 and TE4); an isothermal zone (12); a third thermocouple (TC3) in the isothermal zone (12) for determining a third temperature (T3), wherein the third thermocouple (TC3) is formed at a junction of fifth and sixth thermoelements (TE5 and TE6), wherein the fifth thermoelement (TE5) extends from the third thermocouple (TC3) to a first terminal (TRM1) in a terminal block (14), wherein the sixth thermoelement (TE6) extends from the third thermocouple (TC3) to a second terminal (TRM2) in the terminal block (14), wherein the second thermoelement (TE2) extends from the first thermocouple (TC1) to the third thermocouple (TC3), wherein the third thermoelement (TE3) extends from the second thermocouple (TC2) to the third thermocouple (TC3), wherein the first thermoelement (TE1) extends from the first thermocouple (TC1) to a third terminal (TRM3) in the isothermal zone (12), wherein the fourth thermoelement (TE4) extends from the second thermocouple (TC2) to a fourth terminal (TRM4) in the isothermal zone (12), wherein a strand of fifth thermoelement material (TE5) extends from the third terminal (TRM3) in the isothermal zone (12) to a fifth terminal (TRM5) in the terminal block (14), and wherein a strand of sixth thermoelement material (TE6) extends from the fourth terminal (TRM4) in the isothermal zone (12) to a sixth terminal (TRM6) in the terminal block (14).

The thermocouple assembly preferably further comprises a smart multiplexer connected to the terminals in the terminal block (14), and the smart multiplexer is preferably configured to: determine a reference temperature (T4) at the terminal block (14); measure a voltage difference (VD12) between the first and second terminals (TRM1 and TRM2); determine or estimate the third temperature (T3) using the voltage difference (VD12) between the first and second terminals (TRM1 and TRM2) and the reference temperature (T4) at the thermocouple head (14); measure a voltage difference (VD15) between the first and fifth terminals (TRM1 and TRM5); determine or estimate the first temperature (T1) using the voltage difference (VD15) between the first and fifth terminals (TRM1 and TRM5) and the third temperature (T3) at the terminal block (12); measure a voltage difference (VD26) between the second and sixth terminals (TRM2 and TRM6); and determine or estimate the second temperature (T2) using the voltage difference (VD26) between the second and sixth terminals (TRM2 and TRM6) and the third temperature (T3) at the terminal block (12). Each of the thermoelements preferably comprises thermocouple wire. The multiplexer is preferably configured such that a voltage difference between two terminals is determined while those two terminals are isolated from other terminals for avoiding an interference from a different circuit. The smart multiplexer preferably includes memory for storing tables of data and/or polynomial equations that can be used to correlate a voltage difference to a temperature for a specified thermocouple. The isothermal zone (12) is preferably designed and configured to allow the thermocouple tip to be removed from the isothermal zone (12) and replaced. In one embodiment the isothermal zone (12) comprises a plug for receiving leads from the thermocouple tip. The third terminal (TRM3) in the isothermal zone (12) comprises a connection between the first thermoelement (TE1) and the strand of fifth thermoelement material (TE5). The fourth terminal (TRM4) in the isothermal zone (12) comprises a connection between the fourth thermoelement (TE4) and the strand of sixth thermoelement material (TE6). The first, second, third and fourth thermoelements are type C, G, S, R or B thermocouple wire in a preferred embodiment. The fifth and sixth thermoelements are type N, K, E, J or T thermocouple wire in one embodiment.

Figure 6:
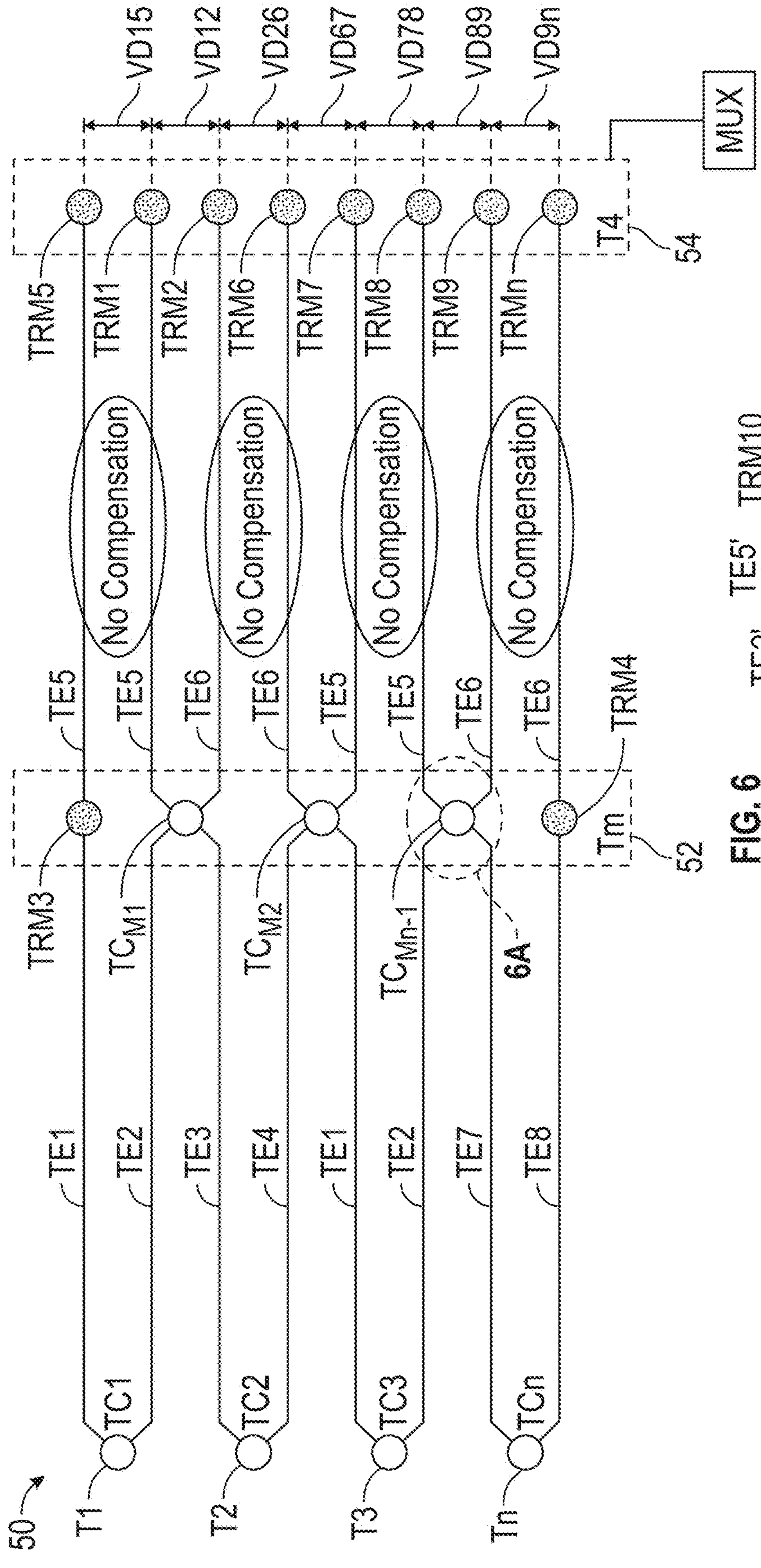
FIG. 6 is a schematic diagram of a thermocouple assembly in which any number of thermocouples for measuring a same number of temperatures have been changed to one or more other types of thermocouple, while continuing to use extension thermoelements for the first type, according to the present invention.

FIG. 6 is a schematic diagram of a thermocouple assembly 50 for determining temperatures T1, T2 and T3 through Tn in hot or cold zones. The concept described for thermocouple assembly 10 with reference to FIG. 3 extends to the measurement of any number of temperatures (up to Tn) measured or determined by a same number of thermocouples (up to TCn) using one fewer proximal or intermediate thermocouples (up to TCn−1). Thermocouple assembly 50 in FIG. 6 includes thermocouples TC1 and TC2 for measuring or determining temperatures T1 and T2, respectively. Thermocouple TC1 is formed at a junction of thermoelements TE1 and TE2, and TC1 is a Type12 thermocouple. TC2 is formed at a junction of thermoelements TE3 and TE4, and TC2 is a Type34 thermocouple.

Thermocouple assembly 50 includes middle 52 and distal 54 terminal blocks, where the middle terminal block 52 is between the thermocouples TC1 and TC2 and the distal terminal block 54. The middle 52 and distal 54 terminal blocks are preferably isothermal blocks at temperatures of Tm and T4, respectively. A thermocouple TCm1 is in the middle terminal block 52 and is formed at a junction of thermoelements TE5 and TE6. Thermocouple TCm1 is a Type56 thermocouple. Thermoelement TE5 extends from thermocouple TCm1 to a terminal TRM1 in the distal terminal block 54. Thermoelement TE6 extends from thermocouple TCm1 to a terminal TRM2 in the distal terminal block 54. Thermoelements TE5 and TE6 comprise different compositions of material so that a voltage difference VD12 can be measured between terminals TRM1 and TRM2 for use in determining the temperature Tm at the middle terminal block 52. A measuring instrument or transmitter (not shown) is used to determine a temperature T4 at the terminals TRM1 and TRM2. The voltage difference VD12 is correlated to a temperature difference Td between Tm and T4 using a chart or polynomial equation provided by the ASTM for a type56 thermocouple, and the temperature Tm is determined or estimated as Td plus T4 by the measuring instrument or transmitter. A solid-state multiplexer MUX is shown in FIG. 6, which operates in the same manner as the multiplexer described above with reference to FIG. 3 for making particular circuits for obtaining particular measurements.

Thermocouples TC1 and TC2 can be the same or different types of thermocouples, and TC1 and TC2 can be near each other or far apart and can be used for measuring the same or different temperatures. Thermoelement TE2 extends from thermocouple TC1 to thermocouple TCm1 and is connected to thermocouple TCm1. Thermoelement TE3 extends from thermocouple TC2 to thermocouple TCm1 and is connected to thermocouple TCm1. Thermoelements TE2 and TE3 can be the same or different compositions of matter. These strands of the thermoelements TE2 and TE3 will be used in separate circuits for determining the temperatures T1 and T2 as explained below. Thermoelement TE1 extends from thermocouple TC1 to a terminal TRM3 in the middle block 52. A strand of the thermoelement TE5 extends between terminal TRM3 and a terminal TRM5 in the distal block 54.

The temperature Tm in the middle block 52 can be used as a reference temperature for determining or estimating the temperature T1. The measuring instrument or a transmitter, which is not shown in the drawings, is preferably programmed to measure a voltage difference VD15 between the terminals TRM1 and TRM5 in the distal block 54. There is no voltage difference between terminals TRM1 and TRM5 that is attributable to a temperature difference between Tm at the middle block 52 and the temperature T4 at the distal block 54 because the same thermoelement TE5 is used between the thermocouple TCm1 and terminal TRM1 and between the terminal TRM3 in the middle block 52 and the terminal TRM5 in the distal block 54. These strands of thermoelement TE5 are labeled in FIG. 6 as having no compensation.

However, a voltage difference exists between terminals TRM1 and TRM5, which is attributable to a temperature difference between the temperature T1 in the hot zone and the temperature Tm in the middle block 52. A temperature difference that corresponds to the voltage difference VD15 can be determined by the measuring instrument or transmitter using the standardized tables or polynomial equations provided by the American Society for Testing and Materials. The temperature difference that corresponds to the voltage difference VD15 is the difference in temperature between the temperature T1 in the hot zone and the temperature Tm in the middle block 52 for a Type12 thermocouple. The temperature T1 in the hot zone can be determined or estimated as the difference in temperature between the temperature T1 in the hot zone and the temperature Tm in the middle block 52 plus the temperature Tm. T1−Tm+Tm=T1.

A thermocouple TCm2 in the middle block 52 is formed at a junction of thermoelements TE6 and TE5. Thermocouple TCm2 is a Type65 thermocouple. Thermoelement TE6 extends from thermocouple TCm2 to a terminal TRM6 in the distal terminal block 54. Thermoelement TE5 extends from thermocouple TCm2 to a terminal TRM7 in the distal terminal block 54. Thermoelement TE4 extends from thermocouple TC2 to thermocouple TCm2 in the middle block 52.

The composition of the thermoelement TE6 between thermocouple TCm2 in the middle block 52 and the terminal TRM6 in the distal block 54 is the same as the composition of the thermoelement TE6 between thermocouple TCm1 in the middle block 52 and terminal TRM2 in the distal block 54. Consequently, no temperature difference between temperature Tm and temperature T4 can be detected by a voltage difference between the terminals TRM2 and TRM6 because no compensation is provided between the middle block 52 and the distal block 54 for the thermoelements TE6 connected to the terminals TRM2 and TRM6. These strands of the thermoelements TE6 are labeled in FIG. 6 as having no compensation because their composition is the same.

The temperature T2 is determined as follows. A voltage difference VD26 exists between terminals TRM2 and TRM6, which is attributable to a temperature difference between the temperature T2 in the hot zone and the temperature Tm in the middle block 52. A temperature difference that corresponds to the voltage difference VD26 can be determined by the measuring instrument or transmitter using the standardized tables or polynomial equations provided by the ASTM. The temperature difference that corresponds to the voltage difference VD26 is the difference in temperature between the temperature T2 in the hot zone and the temperature Tm in the middle block 52 for a Type34 thermocouple. It is considered a Type34 thermocouple because the thermoelements TE3 and TE4 provide the temperature-electromotive force between terminals TRM2 and TRM6, since the same thermoelement TE6 is used between thermocouple TCm1 and terminal TRM2 and between thermocouple TCm2 and terminal TRM6. The temperature T2 in the hot zone can be determined or estimated as the difference in temperature between the temperature T2 in the hot zone and the temperature Tm in the middle block 52 plus the temperature Tm. T2−Tm+Tm=T2

A thermocouple TC3 is formed at a junction of thermoelements TE1 and TE2 for measuring or estimating a temperature T3 in a hot or cold zone. Thermoelements TE1 and TE2 were also used for making thermocouple TC1, but different types of thermoelements can be used because it is not necessary for thermocouple TC3 be the same type as thermocouple TC1. The thermoelement TE1 for thermocouple TC3 extends between thermocouple TC3 and thermocouple TCm2 in the middle block 52. However, it is not necessary to use thermoelements TE1 and TE2 for measuring or estimating a temperature T3 because any two different thermoelements can be used.

A thermocouple TCmn−1 in the middle block 52 is formed at a junction of thermoelements TE5 and TE6. Thermocouple TCmn−1 is a Type56 thermocouple. Thermoelement TE5 for thermocouple TCmn−1 extends from thermocouple TCmn−1 to a terminal TRM8 in the distal terminal block 54. Thermoelement TE6 for thermocouple TCmn−1 extends from thermocouple TCmn−1 to a terminal TRM9 in the distal terminal block 54. The thermoelement TE2 for thermocouple TC3 extends from thermocouple TC3 to thermocouple TCmn−1 in the middle block 52.

The temperature T3 is determined as follows. A voltage difference VD78 exists between terminals TRM7 and TRM8, which is attributable to a temperature difference between the temperature T3 in the hot zone and the temperature Tm in the middle block 52. A temperature difference that corresponds to the voltage difference VD78 can be determined by the measuring instrument or transmitter using the standardized tables or polynomial equations provided by the ASTM. The temperature difference that corresponds to the voltage difference VD78 is the difference in temperature between the temperature T3 in the hot zone and the temperature Tm in the middle block 52 for a Type12 thermocouple. It is considered a Type12 thermocouple because the thermoelements TE1 and TE2 provide the temperature-electromotive force between terminals TRM7 and TRM8, since the same thermoelement TE5 is used between thermocouple TCm2 and terminal TRM7 and between thermocouple TCmn−1 and terminal TRM8. The temperature T3 in the hot zone can be determined or estimated as the difference in temperature between the temperature T3 in the hot zone and the temperature Tm in the middle block 52 plus the temperature Tm. In simple terms. T3−Tm+Tm=T3. In preferred terms, (T3−Tm)+(Tm−T4)+T4. In more preferred terms, dT(7/8)+dT(5/6)+T4=T3 dT(1/2)+dT(5/6)+T4=T3.

Any number of temperatures can be measured or estimated in hot or cold zones up to a temperature Tn being measured or estimated by a thermocouple TCn. The thermocouple TCn can be formed by a junction of any suitable thermoelements for a particular application. The thermocouple TCn in FIG. 6 is illustrated generically as being formed by a junction of thermoelements TE7 and TE8, which are different composition of material so that a temperature-electromotive force will be generated between TE7 and TE8 that can be correlated with the temperature Tn. The thermoelement TE7 extends between the thermocouple TCn and the thermocouple TCmn−1 and is attached to the thermocouple TCmn−1. The thermoelement TE8 extends from the thermocouple TCn to a terminal TRM4 in the middle terminal block 52. A strand of the thermoelement TE6 is connected to the terminal TRM4 and extends to and is connected to a terminal TRMn in the distal terminal block 54.

The temperature Tn is determined as follows. A voltage difference VD9*n* exists between terminals TRM9 and TRMn, which is attributable to a temperature difference between the temperature Tn in the hot zone and the temperature Tm in the middle block 52. A temperature difference that corresponds to the voltage difference VD9*n* can be determined by the measuring instrument or transmitter using the standardized tables or polynomial equations provided by the ASTM. The temperature difference that corresponds to the voltage difference VD9*n* is the difference in temperature between the temperature Tn in the hot zone and the temperature Tm in the middle block 52 for a Type78 thermocouple. It is considered a Type78 thermocouple because the thermoelements TE7 and TE8 provide the temperature-electromotive force between terminals TRM9 and TRMn, since the same thermoelement TE6 is used between thermocouple TCmn−1 and terminal TRM9 and between terminal TRM4 in the middle block 52 and terminal TRMn in the distal block 54. The temperature Tn in the hot zone can be determined or estimated as the difference in temperature between the temperature Tn in the hot zone and the temperature Tm in the middle block 52 plus the temperature Tm. Tn−Tm+Tm=Tn. Or, dT(7/8)+Tm+T4=Tn, where Tm is calculated via dT(5/6) or by other means.

It is important that the terminals TRM3 and TRM4 in the middle block 52 are pass-through connections for the first and last thermoelements used in measuring the temperatures T1 and Tn, respectively. The first thermoelement TE1 passes from thermocouple junction TC1 for measuring temperature T1 to terminal TRM3, and thermoelement TE5 passes from terminal TRM3 in the middle block 52 to terminal TRM5 in the distal block 54, without a thermocouple junction being formed in the middle block 52 at the terminal TRM3. The last thermoelement TE8 passes from thermocouple junction TCn for measuring temperature Tn to terminal TRM4, and thermoelement TE6 passes from terminal TRM4 in the middle block 52 to terminal TRMn in the distal block 54, without a thermocouple junction being formed in the middle block 52 at the terminal TRM4. It is important that there is no compensation between thermoelements for adjacent thermocouple junctions in the middle block 52 so that a temperature difference between the measured temperature in the hot zone and the temperature Tm in the middle block 52 can be determined. As an aside, although it was stated that the terminals TRM3 and TRM4 in the middle block 52 are pass-through connections for the first and last thermoelements used in measuring the temperatures T1 and Tn, respectively, what is important is that the circuit should be broken as was described above.

Figure 6A:
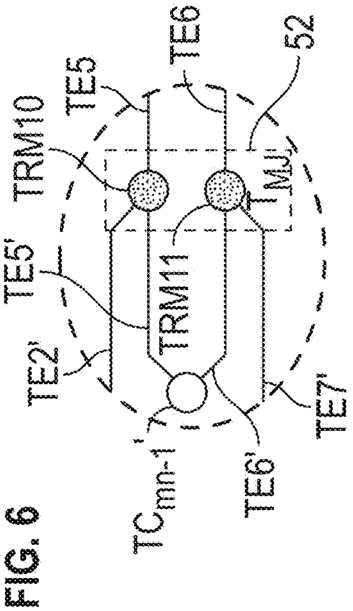
FIG. 6A is an alternative embodiment of the thermocouple assembly of FIG. 6, according to the present invention.

FIG. 6A is an alternative embodiment for the thermocouple TCmn−1 in the middle block 52 in FIG. 6. A thermocouple TCmn−1' is shown outside of the middle isothermal block 52. Thermocouple TCmn−1' is formed at the junction of thermoelements TE5 and TE6, which extend beyond the middle block 52 as thermoelements TE5' and TE6'. Thermoelement TE2 or a thermoelement TE2' extends from the thermocouple TC3 to a terminal TRM10 in the middle block 52. Thermoelement TE7, which is labeled TE7' in FIG. 6A, still extends from the thermocouple TCn to the middle block 52, but to a terminal TRM11 rather than to thermocouple TCmn−1. It is necessary to have one thermocouple junction in the middle block 52 in FIG. 6 for measuring the isothermal temperature Tm in the middle block 52. However, other thermocouples, such as thermocouple TCmn−1', can be used to measure a temperature in a different location. The temperature T3 in FIG. 6 can still be measured or estimated using the alternative configuration illustrated in FIG. 6A, provided there is no compensation between the thermoelement TE5 between thermocouple TCm2 and terminal TRM7 in FIG. 6 and the thermoelement TE5 between terminal 10 in FIG. 6A and the terminal TRM8 in FIG. 6. The temperature Tn in FIG. 6 can still be measured or estimated as described above, but using the alternative configuration illustrated in FIG. 6A, provided that the rules provided herein are followed that concern which thermoelements are compensated and which thermoelements are not compensated so that a temperature difference between Tn and Tm can be determined. It should be noted that TCmn−1' can be of a different TC type than of a TC made of thermoelements 5 and 6. This can be done since one knows the isothermal temperature Tm in the middle block 52 and, therefore, the mV generated by TE5 vs. TE6 for the isothermal temperature Tm. The mV of the thermoelements connected to TCmn−1' is determined by the difference in the total mV at VD89 less the mV for Tm (VD12). TCmn−1' can be of a different TC type than of a TC made of (TEs 5/6). This can be done since one knows the temperature Tm in block 52 and therefore the mV generated by TE5 vs. TE6 for the temperature Tm. The mV of TE5' vs TE6' is determined by the difference in the total mV at TRM8/9 less the mV for Tm (TE 5/6).

Figure 7:
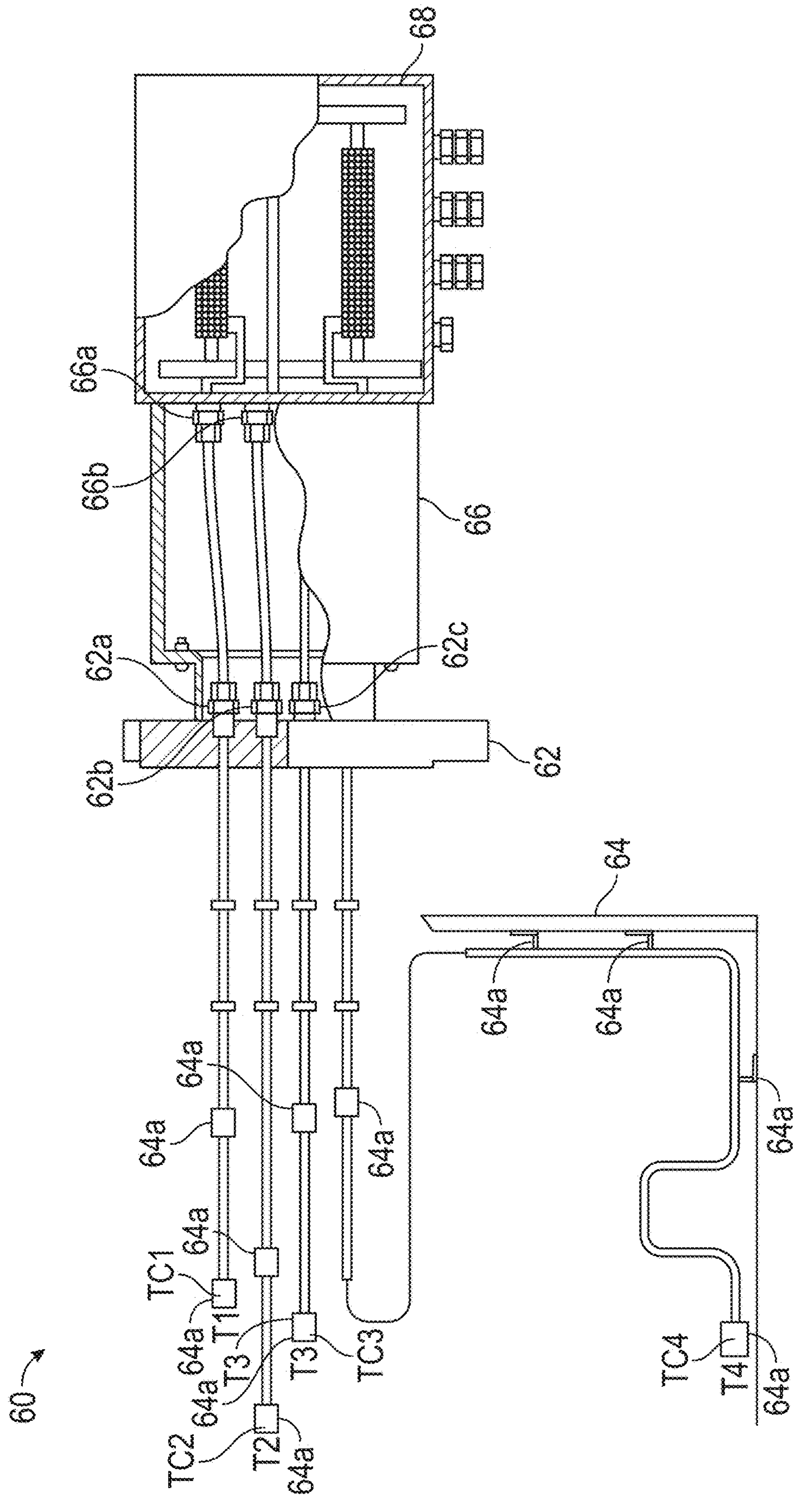
FIG. 7 (PRIOR ART)
FIG. 7 is a side elevation in partial cross-section of a prior art thermocouple assembly in which four thermocouples pass through a flange.

FIG. 7 is a prior art application in which four thermocouples are used. FIG. 7 is a side elevation in partial cross-section of a prior art thermocouple assembly 60 comprising a flange 62 for connection to a vessel 64 and four thermocouples TC1, TC2, TC3 and TC4 that protrude through the flange 62 for measuring four temperatures T1, T2, T3 and T4 inside the vessel 64. Various attachment points 64*a* are provided for attaching the thermocouples within the vessel 64. The flange 62 has four thermocouple seal fittings 62*a*, 62*b*, 62*c* and 62*d*, although seal flange fitting 62*d* is hidden. A secondary barrier assembly 66 is attached to the flange 62, and a terminal box 68 is attached to the secondary barrier assembly 66. The secondary barrier assembly 66 has four thermocouple seal fittings 66*a*, 66*b*, 66*c* and 66*d*, although seal flange fittings 66*c* and 66*d* are hidden. The terminal box 68 has gland seal fitting 68*a*, 68*b*, 68*c* and 68*d* through which the four thermocouples TC1, TC2, TC3 and TC4 would pass for connection to a transmitter, although not shown. The flange 62 has four pass-through holes for the four thermocouples TC1, TC2, TC3 and TC4 for measuring the four temperatures T1, T2, T3 and T4 inside the vessel. The present invention allows the measurement of six (6) temperatures inside the vessel 64 using the same flange 62 with the same four thermocouple seal fittings 62*a*, 62*b*, 62*c* and 62*d*, without the need for more pass-through holes in the flange 62 and so without the need for more thermocouple seal fittings.

Figure 8:
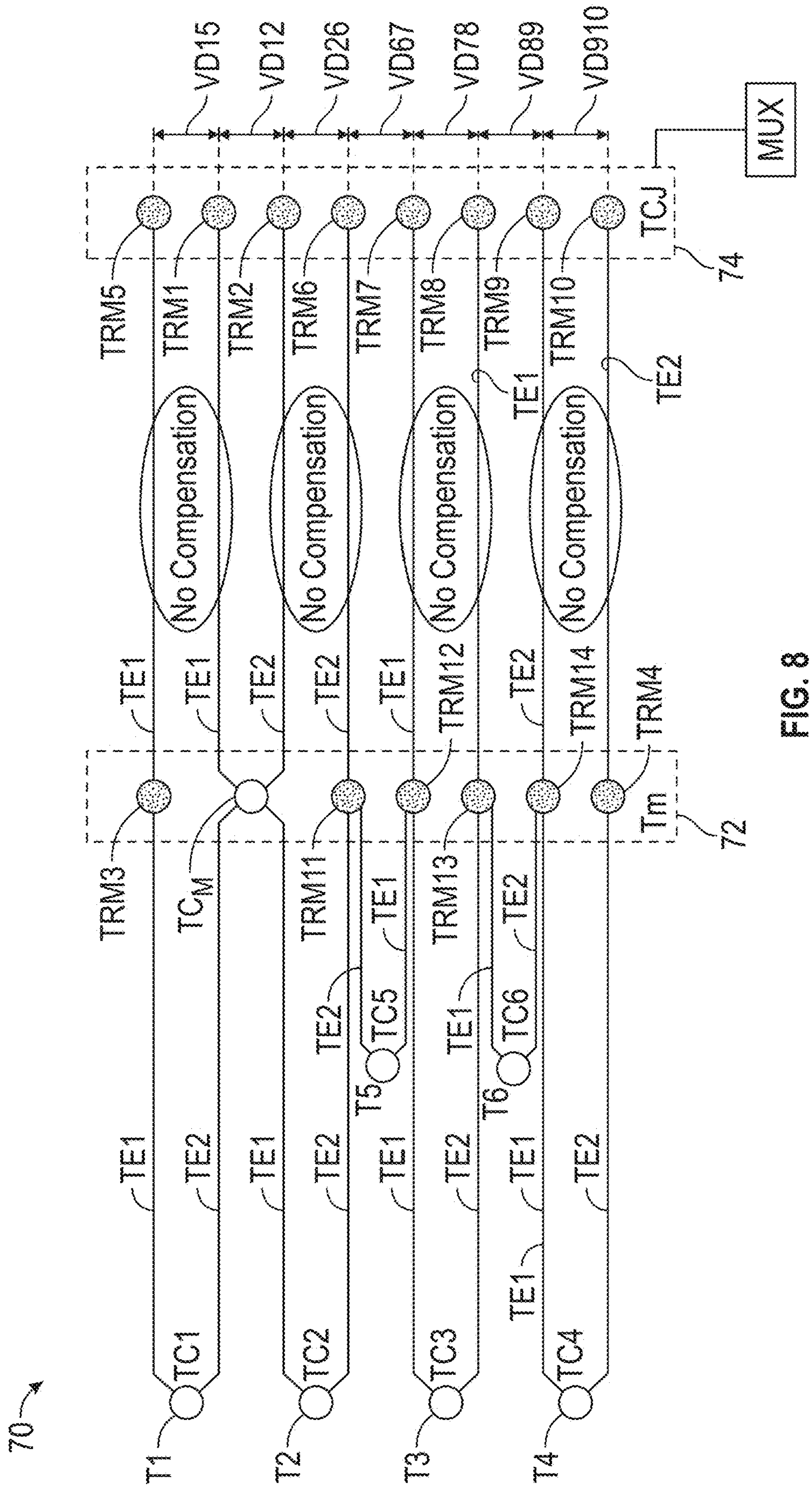
FIG. 8 is a schematic diagram of a thermocouple assembly in which four thermocouples can be used to measure six temperatures, according to the present invention.

FIG. 8 is a schematic diagram of a thermocouple assembly 70 for determining temperatures T1, T2, T3, T4, T5 and T6 in a vessel using four (4) pairs of thermocouple wire. The concept described for thermocouple assembly 60 with reference to FIGS. 6 and 6A is applied to the prior art thermocouple assembly 60 described above with reference to FIG. 7 to get six (6) temperature measurements using the four (4) thermocouples in the prior art thermocouple assembly 60. An aspect of the present invention described above is that a more expensive pair of thermocouple wires can be used to form a junction for measuring a temperature, while a less expensive pair of thermocouple wires can be used to extend to a distant transmitter. The present invention does not require a combination of more and less expensive thermocouple wire. The same type of thermocouple wires are used in this example. A thermocouple is formed at the junction of two different metals. A type K thermocouple is formed when a nickel-chromium alloy wire is welded to a nickel-alumel alloy wire. A less expensive extension wire can be used in the present example, but it is not necessary. The thermocouples in this example are formed when a first thermocouple wire or first thermoelement TE1 is welded to a second thermocouple wire or second thermoelement TE2. Four temperatures T1, T2, T3 and T4 are measured in a vessel using four thermocouples TC1, TC2, TC3 and TC4, respectively. Each of the four thermocouples TC1, TC2, TC3 and TC4 are formed at junctions of first and second thermoelements TE1 and TE2.

Thermocouple assembly 70 includes middle 72 and distal 74 terminal blocks, where the middle terminal block 72 is between the thermocouples TC1, TC2, TC3 and TC4 and the distal terminal block 74. The middle 72 and distal 74 terminal blocks are preferably isothermal blocks at temperatures of Tm and T4, respectively. A thermocouple TCm is in the middle terminal block 72 and is formed at a junction of thermoelements TE1 and TE2. Thermocouple TCm is a Type12 thermocouple, as are all of the other thermocouples in thermocouple assembly 70. A TE1 thermoelement extends from thermocouple TCm to a terminal TRM1 in the distal terminal block 74. A TE2 thermoelement extends from thermocouple TCm1 to a terminal TRM2 in the distal terminal block 74. Thermoelements TE1 and TE2 comprise different compositions of material so that a voltage difference VD12 can be measured between terminals TRM1 and TRM2 for use in determining the temperature Tm at the middle terminal block 72. A solid-state multiplexer MUX is shown in FIG. 8, which operates in the same manner as the multiplexer described above with reference to FIG. 3 for making particular circuits for obtaining particular measurements. The solid-state multiplexer MUX or a measuring instrument or transmitter is used to determine a cold junction temperature TCJ at the terminals TRM1 and TRM2 in the isothermal distal block 74, typically using a thermistor. The voltage difference VD12 is correlated to a temperature difference Td between Tm and TCJ using a chart or polynomial equation provided by the ASTM for a type12 thermocouple, and the temperature Tm is determined or estimated as Td plus TCJ by the solid-state multiplexer MUX, thereby the temperature Tm in the middle block 72 is determined using the thermocouple TCm.

For determining the temperature T1, a TE2 thermoelement extends from thermocouple TC1 to thermocouple TCm and is connected to thermocouple TCm. A TE1 thermoelement extends from thermocouple TC2 to thermocouple TCm and is connected to thermocouple TCm. The strands of the thermoelements TE2 and TE1 that extend from the thermocouples TC1 and TC2 to thermocouple TCm will be used in separate circuits for determining the temperatures T1 and T2 as explained below. A TE1 thermoelement extends from thermocouple TC1 to a terminal TRM3 in the middle block 72. A strand of the thermoelement TE1 extends between terminal TRM3 and a terminal TRM5 in the distal block 74.

The temperature Tm in the middle block 72 can be used as a reference temperature for determining or estimating the temperature T1. The solid-state multiplexer MUX or a measuring instrument or a transmitter is programmed to measure a voltage difference VD15 between the terminals TRM1 and TRM5 in the distal block 74. There is no voltage difference between terminals TRM1 and TRM5 that is attributable to a temperature difference between Tm at the middle block 72 and the temperature TCJ at the distal block 74 because the same thermoelement TE1 is used between the thermocouple TCm and terminal TRM1 and between the terminal TRM3 in the middle block 72 and the terminal TRM5 in the distal block 74. These strands of thermoelement TE1 are labeled in FIG. 8 as having no compensation.

However, a voltage difference exists between terminals TRM1 and TRM5, which is attributable to a temperature difference between the temperature T1 in the hot zone and the temperature Tm in the middle block 72. A temperature difference that corresponds to the voltage difference VD15 can be determined by the solid-state multiplexer MUX or a measuring instrument or a transmitter using the standardized tables or polynomial equations provided by the American Society for Testing and Materials. The temperature difference that corresponds to the voltage difference VD15 is the difference in temperature between the temperature T1 in the hot zone and the temperature Tm in the middle block 72 for a Type12 thermocouple. The temperature T1 in the hot zone can be determined or estimated as the difference in temperature between the temperature T1 in the hot zone and the temperature Tm in the middle block 72 plus the temperature Tm. $T1-Tm+Tm=T1$.

A thermocouple TC2 is used in measuring or estimating the temperature T2. A TE1 thermoelement extends from thermocouple TC2 to thermocouple TCm and is connected to thermocouple TCm. A TE2 thermoelement extends from thermocouple TC2 to a terminal TRM11 in the middle block 72 and is connected to terminal TRM11. A strand of the thermoelement TE2 extends between terminal TRM11 in the middle block 72 and a terminal TRM6 in the distal block 74. The temperature T2 is determined as follows. A voltage difference VD26 exists between terminals TRM2 and TRM6, which is attributable to a temperature difference between the temperature T2 in the hot zone and the temperature Tm in the middle block 72. A temperature difference that corresponds to the voltage difference VD26 can be determined by the solid-state multiplexer MUX or a measuring instrument or a transmitter using the standardized tables or polynomial equations provided by the ASTM. The temperature difference that corresponds to the voltage difference VD26 is the difference in temperature between the temperature T2 in the hot zone and the temperature Tm in the middle block 72 for a Type12 thermocouple. It is considered a Type12 thermocouple because the thermoelements TE1 and TE2 provide the temperature-electromotive force between terminals TRM2 and TRM6, since the same thermoelement TE2 is used between thermocouple TCm and terminal TRM2 and between thermocouple terminal TRM11 and terminal TRM6. The solid-state multiplexer MUX is used to isolate a circuit for determining the temperature T2 without interference from other circuits. The temperature T2 in the hot zone can be determined or estimated as the difference in temperature between the temperature T2 in the hot zone and the temperature Tm in the middle block 72 plus the temperature Tm. T2−Tm+Tm=T2.

A thermocouple TC3 is used in measuring or estimating the temperature T3. A TE1 thermoelement extends from thermocouple TC3 to a terminal TRM12 in the middle block 72 and is connected to terminal TRM12. A TE2 thermoelement extends from thermocouple TC2 to a terminal TRM13 in the middle block 72 and is connected to terminal TRM13. A strand of the thermoelement TE1 extends between terminal TRM12 in the middle block 72 and a terminal TRM7 in the distal block 74. A strand of the thermoelement TE1 extends between terminal TRM13 in the middle block 72 and a terminal TRM8 in the distal block 74.

The temperature T3 is determined as follows. A voltage difference VD78 exists between terminals TRM7 and TRM8, which is attributable to a temperature difference between the temperature T3 in the hot zone and the temperature Tm in the middle block 72. A temperature difference that corresponds to the voltage difference VD78 can be determined by the solid state multiplexer MUX or a measuring instrument or a transmitter using the standardized tables or polynomial equations provided by the ASTM. The temperature difference that corresponds to the voltage difference VD78 is the difference in temperature between the temperature T3 in the hot zone and the temperature Tm in the middle block 72 for a Type12 thermocouple. It is considered a Type12 thermocouple because the thermoelements TE1 and TE2 provide the temperature-electromotive force between terminals TRM7 and TRM8, since the same thermoelement TE1 is used between terminal TRM12 and terminal TRM7 and between terminal TRM13 and terminal TRM8. The solid state multiplexer MUX is used to isolate a circuit so that the temperature T3 in the hot zone can be determined or estimated as the difference in temperature between the temperature T3 in the hot zone and the temperature Tm in the middle block 72 plus the temperature Tm. In simple terms. T3−Tm+Tm=T3. In preferred terms, (T3−Tm)+(Tm−T3)=T3.

A thermocouple TC4 is used in measuring or estimating the temperature T4. A TE1 thermoelement extends from thermocouple TC4 to a terminal TRM14 in the middle block 72 and is connected to terminal TRM14. A TE2 thermoelement extends from thermocouple TC2 to a terminal TRM4 in the middle block 72 and is connected to terminal TRM4. A strand of the thermoelement TE2 extends between terminal TRM14 in the middle block 72 and a terminal TRM9 in the distal block 74. A strand of the thermoelement TE2 extends between terminal TRM4 in the middle block 72 and a terminal TRM10 in the distal block 74.

The temperature T4 is determined as follows. A voltage difference VD910 exists between terminals TRM9 and TRM10, which is attributable to a temperature difference between the temperature T4 in the hot zone and the temperature Tm in the middle block 72. A temperature difference that corresponds to the voltage difference VD910 can be determined by the solid state multiplexer MUX or a measuring instrument or a transmitter using the standardized tables or polynomial equations provided by the ASTM. The temperature difference that corresponds to the voltage difference VD910 is the difference in temperature between the temperature T4 in the hot zone and the temperature Tm in the middle block 72 for a Type12 thermocouple. It is considered a Type12 thermocouple because the thermoelements TE1 and TE2 provide the temperature-electromotive force between terminals TRM9 and TRM10, since the same thermoelement TE2 is used between terminal TRM14 and terminal TRM9 and between terminal TRM4 and terminal TRM10. The solid state multiplexer MUX is used to isolate a circuit so that the temperature T4 in the hot zone can be determined or estimated as the difference in temperature between the temperature T4 in the hot zone and the temperature Tm in the middle block 72 plus the temperature Tm. In simple terms. T4−Tm+Tm=T4.

The one thermocouple TCm for determining the temperature Tm in the middle block 72 and the terminals TRM11, TRM12, TRM13 and TRM14 in the middle block 72 allow two more temperatures T5 and T6 to be determined in a hot or cold zone in a vessel in which the temperatures T1 to T4 are determined. A thermocouple TC5 is used to measure or estimate the temperature T5. A TE2 thermoelement extends between thermocouple TC5 and terminal TRM11 in the middle block 72. A TE1 thermoelement extends between thermocouple TC5 and terminal TRM12 in the middle block 72. A TE2 thermoelement extends between terminal TRM11 and terminal TRM6 in the distal block 74. A TE1 thermoelement extends between terminal TRM12 and terminal TRM7 in the distal block 74. There is compensation between the TE2 and the TE1 strands, which extend all the way from thermocouple TC5 to the terminals TRM6 and TRM7 in the distal block 74, respectively. The MUX multiplexer can be and should be configured to isolate this TE2−TE1 circuit from TC5 to the terminals TRM6 and TRM7 in the distal block 74 and to determine the temperature T5. The voltage difference VD67 is correlated to a temperature difference Td between T5 and the cold junction temperature TCJ in the distal block 74 using a chart or polynomial equation provided by the ASTM for a type12 thermocouple, and the temperature T5 is determined or estimated as Td plus TCJ by the solid-state multiplexer MUX, thereby the temperature T5 in the hot zone is determined using the thermocouple TC5.

A thermocouple TC6 is used to measure or estimate the temperature T6. A TE1 thermoelement extends between thermocouple TC6 and terminal TRM13 in the middle block 72. A TE2 thermoelement extends between thermocouple TC6 and terminal TRM14 in the middle block 72. A TE1 thermoelement extends between terminal TRM13 and terminal TRM8 in the distal block 74. A TE2 thermoelement extends between terminal TRM14 and terminal TRM9 in the distal block 74. There is compensation between the TE1 and the TE2 strands, which extend all the way from thermocouple TC6 to the terminals TRM8 and TRM9 in the distal block 74, respectively. The MUX multiplexer can be and should be configured to isolate this TE1-TE2 circuit from TC6 to the terminals TRM8 and TRM9 in the distal block 74 and to determine the temperature T6. A chart or a polynomial equation provided by the ASTM for a type12 thermocouple should be stored in memory in the MUX multiplexer. The voltage difference VD89 is correlated to a temperature difference Td between T6 and the cold junction temperature TCJ in the distal block 74 using the chart or polynomial equation provided by the ASTM for a type12 thermocouple, and the temperature T6 is determined or estimated as Td plus TCJ by the solid-state multiplexer MUX, thereby the temperature T6 in the hot zone is determined using the thermocouple TC6.

The TC5 and TC6 thermocouples can be located anywhere in a hot or cold zone. Four (4) pairs of thermocouple wire extend between the middle block 72 and the distal block 74. By adding terminals in the middle block 72 and measuring the temperature Tm in the middle block 72, which should be an isothermal block, and connecting thermocouple wires to terminals as described with reference to FIG. 8, four (4) pairs of thermocouple wire, which is eight (8) thermoelements, one can measure or determine six (6) temperatures (T1, T2, T3, T4, T5 and T6) in a hot or cold zone using six (6) thermocouples (TC1, TC2, TC3, TC4, TC5 and TC6).

Thermoelements for four (4) thermocouples extend from the distal block 74 to the middle block 12, but six (6) thermocouples are formed in the hot or cold zone. Four (4) pairs of thermocouple wire from the distal block 74 to the middle block 72 yields six (6) thermocouples in a hot or cold zone plus one thermocouple in the middle block 72. Six (6) pairs of thermocouple wire from the distal block 74 to the middle block 72 yields ten (10) thermocouples in a hot or cold zone plus one thermocouple in the middle block 72. Eight (8) pairs of thermocouple wire from the distal block 74 to the middle block 72 yields fourteen (14) thermocouples in a hot or cold zone plus one thermocouple in the middle block 72. There appears to be a pattern that fits an equation of (number of pairs of thermocouple wire from the distal block 74 to the middle block 72 times two) minus two equals the number of thermocouples in a hot or cold zone plus a thermocouple in the middle block 72. The one thermocouple in the middle block 72 provides the equivalent of a cold junction temperature in the middle block 72, which should be an isothermal block. The one thermocouple in the middle block 72 is needed for providing a cold junction temperature in the middle block 72. The one thermocouple in the middle block 72 can be referred to as TCJm. The equation for pairs of thermocouple wire extending between the distal block 74 to the middle block 72 (Pairs) and thermocouples in the hot or cold zone (TCs) appears to be (Pairs×2)−2=TCs+TCJm. This equation appears to work for four, six and eight pairs of thermocouple wire of different materials that can be welded together and used to form a thermocouple junction. Extension wire can be used between the distal block 74 and the middle block 72, and a higher grade thermocouple wire can be used in the hot or cold zone. Type K extension wire or thermocouple wire can be used between blocks 74 and 72, while type B, C, E, G, J, S, R or T can be used to form thermocouples in the hot or cold zone, which is typically inside a vessel.

The description of FIG. 8 can be generalized as one embodiment in which a thermocouple assembly comprises: an isothermal terminal block A and a cold junction terminal block B; x pairs of thermoelements extending between blocks A and B, wherein each pair of thermoelements is capable of forming a thermocouple and comprises a positive leg and a negative leg, and wherein each positive leg and each negative leg is connected to a separate terminal in block B; a TCa thermocouple formed in block A with one pair of thermoelements, wherein each of the remaining legs is connected to a separate terminal in block A, wherein a first terminal in block A has a positive leg and a last terminal in block A has a negative leg or vice versa; (2x−2) TCz thermocouples for measuring or determining temperature in a temperature measurement zone, wherein the TCz thermocouples are formed at the junction of two dissimilar thermocouple wires that extend from the thermocouple TCa or from one of the terminals in block A; and a smart multiplexer connected to each terminal in block B, wherein the multiplexer is configured to: obtain and use a cold junction temperature for block B; obtain and use a temperature at the TCa thermocouple; isolate a circuit for each of the TCz thermocouples; and determine or measure a temperature at each of the TCz thermocouples. Two thermocouple wires are connected to each terminal in block A, except only one thermocouple wire is attached to each of the first and last terminals.

The embodiment is preferably further described as one in which each of the temperatures at x number of the TCz thermocouples is determined or measured using a pair of either positive or negative legs of the thermoelements, preferably wherein each of the temperatures at (x−2) number of the TCz thermocouples is determined or measured using a positive and a negative thermoelement leg, preferably wherein the TCz thermocouples are type B, C, E, G, J, S, R or T, and preferably wherein the thermoelements are type K or N extension wire or compensating cable. Any type of thermocouple wire and any type of thermoelements can be used provided proper dissimilar metals are used where necessary and provided that the rules set forth herein are followed with respect to there being no compensation between theremoelements while certain circuits are analyzed by the multiplexer.

The description of FIG. 8 can be generalized as another embodiment in which a method for measuring or determining temperatures comprises the steps of: placing an isothermal terminal block A between a cold junction terminal block B and a temperature measurement zone Z; extending x pairs of thermoelements TE between blocks A and B, wherein each pair of TE comprises a positive leg and a negative leg, and wherein each positive leg and each negative leg is attached to a separate terminal in block B; forming a thermocouple TCa in block A with one pair of TE; attaching each of the remaining legs to a separate terminal in block A, wherein a first terminal in block A has a positive leg and a last terminal in block A has a negative terminal; forming (2x−2) thermocouples in zone Z using two dissimilar thermocouple wires that extend from the thermocouple TCa or from one of the terminals in block A; and connecting a smart multiplexer to each terminal in block B, wherein the multiplexer is configured to: obtain and use a cold junction temperature for block B; obtain and use a temperature measured by thermocouple TCa; isolate a circuit for each of the thermocouples in zone Z; and determine a temperature measured by each of the thermocouples in zone Z. Two theremocouple wires are connected to each terminal in block A, except the first and last terminals receive only one thermocouple wire each.

Figure 9:
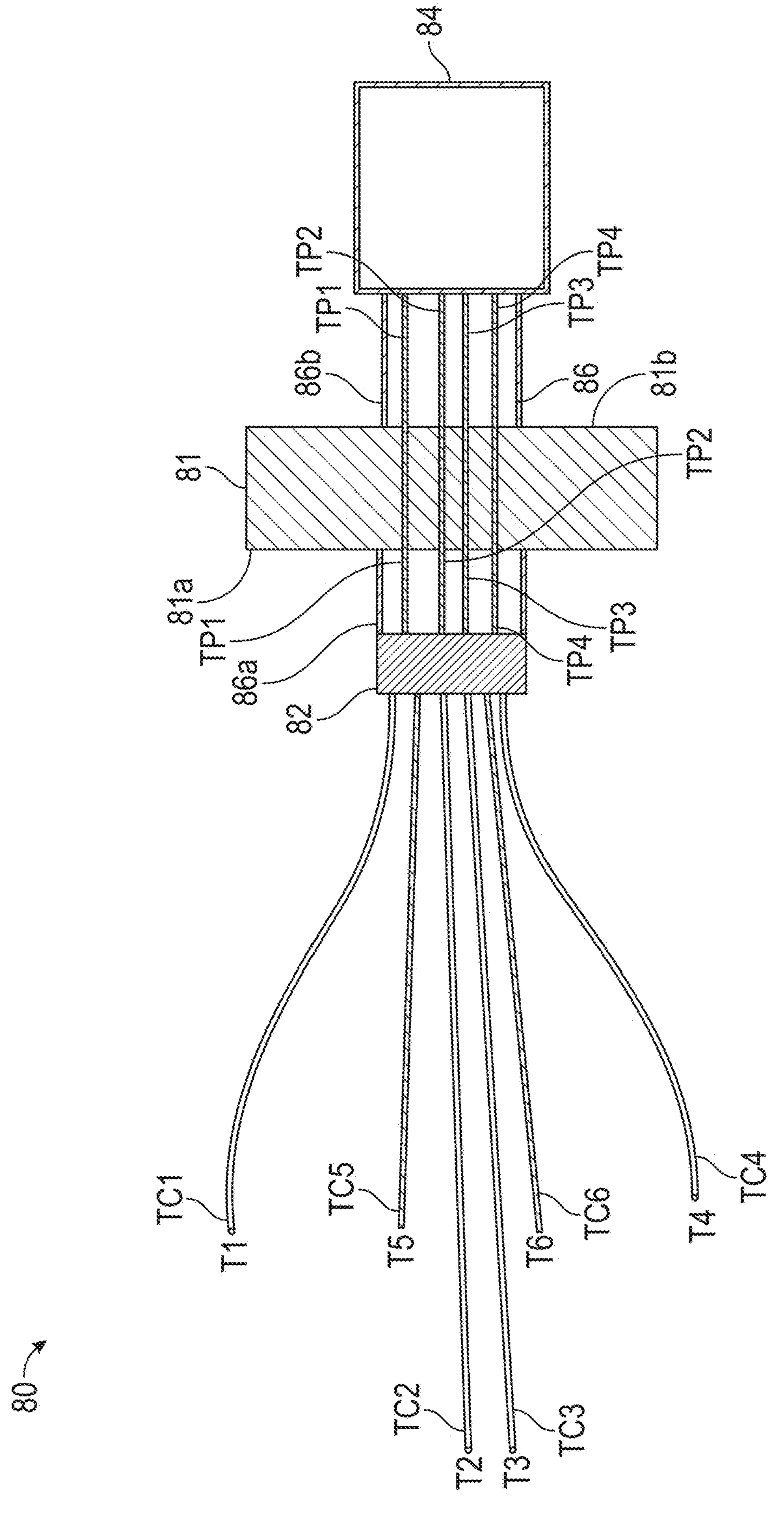
FIG. 9 is a side elevation in partial cross-section of a multipoint thermocouple assembly in which four thermocouples pass through a flange and are used to make six thermocouples, according to the present invention.

FIG. 9 is a side elevation in partial cross-section of a multipoint thermocouple assembly 80 in which the concepts discussed above, particularly with reference to FIG. 8, are implemented in an apparatus. A flange 81 is provided for connection to a process vessel, although a different mounting device could be used for a connection to a different structure. For this example, the process vessel contains a hot zone. A middle isothermal block 82 is located adjacent to the flange 81 and will be inside the process vessel during operation of the vessel. The middle isothermal block 82 comprises the terminals TRM3, TRM4, TRM11, TRM12, TRM13 and TRM14 and the thermocouple junction TCm for determining the temperature Tm in the middle isothermal block 82, as was described for FIG. 8. A terminal box 84 contains the terminals and preferably the multiplexer MUX described for the distal block 74 in FIG. 8, although the multiplexer MUX can be located remotely and be connected to the terminal box 84. The terminal box 84 should be isothermal, and the multiplexer should measure or determine a cold junction temperature in the terminal box 84. Flange 81 has four through holes through which four pairs of thermocouple wire pass for a total of eight thermoelements passing from the terminal box 84 through the flange 81 to the middle isothermal block 82. The four thermocouple pairs are identified as TP1, TP2, TP3 and TP4. A secondary barrier assembly 86*a* is shown in cross-section and provides a sealed passageway between middle isothermal block 82 and the flange 81. A secondary barrier assembly 86*b* is shown in cross-section and provides a sealed passageway between the flange 81 and the terminal box 84. Each of the thermocouple pairs TP1, TP2, TP3 and TP4 is sealed with the middle isothermal block 82, the flange 81 and the terminal box 84 as was described for the prior art thermocouple assembly 60 in FIG. 7. The conical seal fitting 36 described with reference to FIG. 5 can be used for sealing tubes. In some applications it may be possible to mount the middle isothermal block 82 to the flange 81 and eliminate the secondary barrier assembly 86*a*. It may also be possible to combine the secondary barrier assembly 86*b* and the terminal box 84 into one assembly that is connected to the flange 81.

Each thermocouple pair has two thermoelements that comprise two different compositions of material. The thermoelements of the thermocouple pairs TP1, TP2, TP3 and TP4 are connected to terminals in the middle isothermal block 82 as was described with reference to FIG. 8, except one pair is used for making the thermocouple junction TCm for measuring the temperature Tm in the middle isothermal block 82. As was described for FIG. 8, six (6) thermocouples (TC1, TC2, TC3, TC4, TC5 and TC6) can be placed in the hot or cold zone inside the vessel to measure or determine six (6) temperatures (T1, T2, T3, T4, T5 and T6) from the four (4) pairs of thermocouple wire (TP1, TP2, TP3 and TP4). In other embodiments of the multipoint thermocouple assembly 80 described with reference to FIG. 9, more thermocouples can be placed in the hot or cold zone in the vessel. The number of thermocouples that can be placed in the hot or cold zone in the vessel is twice the number of thermocouple pairs minus one pair for making a thermocouple junction in the middle isothermal block 82 and one pair that passes through the middle isothermal block 82 to the hot or cold zone with one lead used in one thermocouple and the other lead used in a different thermocouple. These pass-through leads make it possible for multiplexer MUX to isolate particular circuits for determining particular temperatures. A different type of thermocouple can be used in measuring the temperatures in the hot or cold zone than is used in the thermocouple pairs that extend between the middle isothermal block 82 and the terminal box 84. For example, type K thermocouple wire may be used between the middle isothermal block 82 and the terminal box 84, while type N thermocouple wire is used for thermocouples TC1, TC2, TC3, TC4, TC5 and TC6. Another aspect of the present invention is that the thermocouples TC1, TC2, TC3, TC4, TC5 and TC6 are separate and independent, which means that one of the thermocouples TC1, TC2, TC3, TC4, TC5 or TC6 can fail with the circuit for determining the temperature at the failed thermocouple becoming discontinuous, and all of the remaining thermocouples can continue to operate properly without interference from the failed thermocouple.

An embodiment A of the present invention is a multipoint thermocouple assembly 80 comprising a flange 81, wherein the flange has an inside face 81*a* and an outside face 81*b*; an inside isothermal terminal block 82 attached directly or indirectly to the inside face of the flange; an outside isothermal terminal block 84 attached directly or indirectly to the outside face of the flange; x pairs of thermoelements extending between the inside isothermal terminal block 82 through the flange to the outside isothermal terminal block 84; at least 2x−2 terminals in the inside isothermal terminal block 82; at least one thermocouple junction TCin formed in or at the inside isothermal terminal block 82 for measuring or determining a temperature in the inside isothermal terminal block 82; at least 2x terminals in the outside isothermal terminal block 84; as many as 2x−2 thermocouples protruding from the inside isothermal terminal block 82; a multiplexer connected to each of the terminals in the outside isothermal terminal block 84, wherein the multiplexer is configured to select a pair of terminals and analyze a circuit that includes that pair of terminals while isolating that pair of terminals from other terminals in the outside isothermal terminal block 84, and wherein the multiplexer is configured to measure, determine or estimate a temperature for each of the thermocouples.

The embodiment A above, wherein x is 4 so that 4 pairs of thermoelements extend from the outside isothermal terminal block 84 through the flange to inside isothermal terminal block 82, wherein the outside isothermal terminal block 84 has 8 terminals, wherein each thermoelement is connected to one of the 8 terminals, and wherein the inside isothermal terminal block 82 has 6 terminals 1-6 and the thermocouple TCin, thereby forming an embodiment B.

The embodiment B above, wherein a pair of thermoelements is said to have a positive lead and a negative lead, wherein a positive lead extends from the outside isothermal terminal block 84 to a first terminal 1 in the inside isothermal terminal block 82 and a thermocouple wire from terminal 1 to a first thermocouple TC1, wherein a negative lead extends from the outside isothermal terminal block 84 to a sixth terminal 6 in the inside isothermal terminal block 82 and a thermocouple wire from terminal 6 to a fourth thermocouple TC4, wherein a positive lead extends from the outside isothermal terminal block 84 to thermocouple TCin located in or at the inside isothermal terminal block 82, wherein a negative lead extends from the outside isothermal terminal block 84 to thermocouple TCin located in or at the inside isothermal terminal block 82, wherein a negative lead extends from the thermocouple TCin to the thermocouple TC1, wherein a positive lead extends from the thermocouple TCin to a second thermocouple TC2, wherein a negative lead extends from the outside isothermal terminal block 84 to a second terminal 2 in the inside isothermal terminal block 82 and on to the second thermocouple TC2, wherein a positive lead extends from the outside isothermal terminal block 84 to a third terminal 3 in the inside isothermal terminal block 82 and on to a third thermocouple TC3, wherein a positive lead extends from the outside isothermal terminal block 84 to a fourth terminal 4 in the inside isothermal terminal block 8, wherein a negative lead extends from the fourth terminal 4 to the third thermocouple TC3, wherein a negative lead extends from the outside isothermal terminal block 84 to a firth terminal 5 in the inside isothermal terminal block 82, wherein a positive lead extends from the fifth terminal 5 to the fourth thermocouple TC4, thereby forming an embodiment C.

The embodiment C above, wherein a negative lead extends from the second terminal 2 in the inside isothermal terminal block 82 to a fifth thermocouple TC5, wherein a positive lead extends from the third terminal 3 in the inside isothermal terminal block 82 to the fifth thermocouple TC5, wherein a positive lead extends from the fourth terminal 4 in the inside isothermal terminal block 82 to a sixth thermocouple TC6, and wherein a negative lead extends from the fifth terminal 5 in the inside isothermal terminal block 82 to the sixth thermocouple TC6.

A method for providing more thermocouples in a vessel than the number of thermocouples that enter the vessel, comprising the steps of: providing an isothermal terminal block inside the vessel; providing an isothermal terminal block outside the vessel; extending y thermoelements between the inside and outside terminal blocks, wherein half of the thermoelements are considered positive thermoelements and the other half are considered negative thermoelements; connecting each of the y thermoelements to a separate terminal in the outside terminal block; forming a reference thermocouple for the inside terminal block using two of the thermoelements; connecting each of the y−2 thermoelements to a separate terminal in the inside terminal block; extending a positive thermoelement from a first terminal to a first thermocouple; extending a negative thermoelement from a last terminal to a last thermocouple; extending a negative thermoelement from the first thermocouple to the reference thermocouple; extending a positive thermoelement from the second thermocouple to the reference thermocouple; forming a first set of thermocouples by extending appropriate thermoelements from terminals in the inside terminal block, wherein a circuit can be made for each of the first set of thermocouples using either a pair of positive thermoelements or a pair of negative thermoelements between the inside and outside isothermal terminal blocks; and forming a second set of thermocouples by extending appropriate thermoelements from terminals in the inside terminal block, wherein a circuit can be made for each of the second set of thermocouples using a positive thermoelement and a negative thermoelement between the inside and outside isothermal terminal blocks, wherein each of the terminals in the inside isothermal terminal block has two thermoelements connected to it other than the first and last terminals.

Embodiments of the Invention

Various embodiments of the invention can be described as follows.

Embodiment 1. A thermocouple assembly for measuring at least two temperatures, comprising:

a thermocouple TC1 for measuring a temperature T1;

a thermocouple TC2 for measuring a temperature T2, wherein T1 and T2 may have equal or different values and may be in the same or different locations;

a first terminal block TB1 and a second terminal block TB2, wherein the terminal block TB1 is between the thermocouple TC1 and the terminal block TB2;

a thermocouple TC3 for measuring a temperature T3 at the terminal block TB1;

a pair of compensated thermoelements TE1 and TE2 joined to form thermocouple TC1;

a pair of compensated thermoelements TE3 and TE4 joined to form thermocouple TC2;

a pair of compensated thermoelements TE5 and TE6 joined to form thermocouple TC3, wherein thermoelements TE1, TE2, TE3, TE4, TE5 and TE6 comprise any suitable composition of matter for a desired application, wherein thermoelements TE5 and TE6 extend from thermocouple TC3 and connect to terminals TRM1 and TRM2, respectively, in the terminal block TB2, wherein thermoelement TE1 connects to a terminal TRM3 in the terminal block TB1, wherein thermoelement TE2 connects to thermocouple TC3, wherein thermoelement TE3 connects to thermocouple TC3, and wherein thermoelement TE4 connects to a terminal TRM4 in the terminal block TB1;

a strand of thermoelement TE5 connected to terminal TRM3 in the terminal block TB1 and extending to a terminal TRM5 in the terminal block TB2;

a strand of thermoelement TE6 connected to terminal TRM4 in the terminal block TB1 and extending to a terminal TRM6 in the terminal block TB2;

a measuring instrument transmitter Tr operatively connected to the second terminal block TB2, wherein the transmitter Tr is designed and configured to determine an ambient temperature Ta at the terminal block TB2 and to have standardized tables or polynomial equations provided by the American Society for Testing and Materials for correlating voltage differences to temperature differences for one or more types of thermocouples;

wherein the transmitter Tr is designed and configured to determine a voltage difference VD12 between terminals TRM1 and TRM2 and to use the voltage difference VD12 and the ambient temperature Ta to determine or estimate the temperature T3 at the thermocouple TC3;

a switching and calculating device SCD operatively connected to the second terminal block TB2 and the transmitter Tr that is designed and configured to connect and disconnect terminals in the second terminal block TB2, wherein the transmitter Tr and the device SCD are designed and configured to determine or estimate the temperature T1 using a voltage difference VD15 between terminals TRM1 and TRM5 while terminals TRM2 and TRM6 are not connected to another terminal, and wherein the transmitter Tr and the device SCD are designed and configured to determine or estimate the temperature T2 using a voltage difference VD26 between terminals TRM2 and TRM6 while terminals TRM1 and TRM5 are not connected to another terminal.

Embodiment 2. The thermocouple assembly of embodiment 1, wherein the switching and calculating device SCD is a multiplexer.

Embodiment 3. The thermocouple assembly of embodiment 1, wherein the thermoelement TE3 has the same composition of matter as the thermoelement TE1, and wherein the thermoelement TE4 has the same composition of matter as the thermoelement TE2, or wherein the thermoelement TE3 comprises a composition of matter that is not the same as the composition of matter that thermoelement TE1 comprises, and/or wherein the thermoelement TE4 comprises a composition of matter that is not the same as the composition of matter that thermoelement TE2 comprises.

Embodiment 4. The thermocouple assembly of embodiment 1, wherein neither the thermoelement TE5 nor TE6 has the same composition of matter as the thermoelement TE1 or TE2, and preferably wherein wherein neither the thermoelement TE5 nor TE6 has the same composition of matter as the thermoelement TE3 or TE4.

Embodiment 5. A thermocouple assembly, comprising:

first and second thermocouples for measuring first and second desired temperatures, respectively;

first and second pairs of compensated thermoelements that extend from the first and second thermocouples, respectively, to a first isothermal block;

a third thermocouple for measuring a temperature of the first isothermal block, wherein one thermoelement from each of the first and second thermocouples connects to the third thermocouple;

two terminals in the first isothermal block, wherein the other thermoelement from each of the first and second thermocouples connects to one of said terminals;

a second isothermal block, wherein the first isothermal block is between the first and second thermocouples and the second isothermal block;

a pair of compensated thermoelements 1 and 2 extending from the third thermocouple to separate terminals in the second isothermal block;

a strand of thermoelement 1 extending from one of the two terminals in the first isothermal block to a separate terminal in the second isothermal block;

a strand of thermoelement 2 extending from the other of the two terminals in the first isothermal block to a separate terminal in the second isothermal block;

a measuring instrument transmitter and a switching device operatively connected to the second isothermal block, wherein the transmitter is designed and configured to indicate an ambient temperature for the second isothermal block and to determine or estimate the temperature of the first isothermal block, and wherein the transmitter and the switching device are designed and configured to determine or estimate the first and second desired temperatures.

Embodiment 6. A thermocouple assembly comprising:

first and second thermocouples having positive and negative leads extending to a first block, wherein the positive lead from the first thermocouple connects to a first separate and independent terminal in the first block, wherein the negative lead from the second thermocouple connects to a second separate and independent terminal in the first block, and wherein the negative lead from the first thermocouple and the positive lead from the second thermocouple connect to a third thermocouple, wherein the third thermocouple is located in the first block;

positive and negative extension wires extending from the third thermocouple to third and fourth terminals, respectively, in a second block, wherein the extension wire comprises a material that does not match with material in the positive and negative leads of the first and second thermocouples;

a positive or negative extension wire extending from the first terminal to a fifth terminal in the second block;

a negative or positive extension wire extending from the second terminal to a sixth terminal in the second isothermal block, wherein the extension wire to the sixth terminal has an opposite polarity to the extension wire to the fifth terminal; and means connected to and/or engaged with the second block for opening and closing connections between the terminals in the second block, wherein the means is designed and configured to determine temperatures at the first and second blocks and to use said temperatures and correlations between voltage differences and temperature differences to determine or estimate temperatures at the first and second thermocouples.

Embodiment 7. The thermocouple assembly of embodiment 6, wherein the means comprises a measuring instrument transmitter and a switching and calculating device, wherein the transmitter is designed and configured to measure, determine or estimate an ambient temperature at the second block and a temperature at the third thermocouple, and wherein the device is designed and configured to open and close circuits and to make calculations and/or correlations for determining temperatures at the first and second thermocouples.

Embodiment 8. The thermocouple assembly of embodiment 6 or 7, wherein the switching and calculating device is a multiplexer.

Embodiment 9. A thermocouple assembly comprising:

first and second type N thermocouples having positive and negative leads extending to a first isothermal block, wherein the positive lead from the first thermocouple connects to a first separate and independent terminal in the first isothermal block, wherein the negative lead from the second thermocouple connects to a second separate and independent terminal in the first isothermal block, and wherein the negative lead from the first thermocouple and the positive lead from the second thermocouple connect to a third thermocouple located in the first isothermal block;

positive and negative type K extension wires extending from the third thermocouple to third and fourth terminals, respectively, in a second isothermal block;

a positive type K extension wire extending from the first terminal to a fifth terminal in the second isothermal block;

a negative type K extension wire extending from the second terminal to a sixth terminal in the second isothermal block; and means connected to and/or engaged with the second isothermal block for opening and closing connections between the terminals in the second isothermal block, wherein the means is designed and configured to determine temperatures at the first and second isothermal blocks and to use said temperatures and correlations between voltage differences and temperature differences to determine or estimate temperatures at the first and second type N thermocouples, and wherein the actual polarity of the positive and negative elements is not an essential feature of the thermocouple assembly.

Embodiment 10. A thermocouple assembly comprising:

thermocouples TC1 and TC2 to TCn for measuring temperatures T1 and T2 through Tn, respectively, wherein TC1 is formed at a junction of thermoelements TE1 and TE2, wherein TC1 is a Type12 thermocouple, wherein TC2 is formed at a junction of thermoelements TE3 and TE4, wherein TC2 is a Type34 thermocouple, wherein each of the thermocouples from TC2 to TCn is made in a manner similar to TC1 and TC2, and wherein the thermocouples TC1 and TC2 to TCn can be the same or different or a variety of types of thermocouples;

proximal and distal isothermal blocks with respect to TC1 and TC2;

a thermocouple TCp formed at a junction of thermoelements TE5 and TE6 and located in the proximal block, wherein thermocouple TCp is a Type56 thermocouple, wherein thermoelements TE5 and TE6 terminate at terminals TRM1 and TRM2 in the distal block, respectively, wherein thermoelement TE2 from TC1 and thermoelement TE3 from TC2 are connected to thermocouple TCp;

a total of n−1 thermocouple junctions including the junction for thermocouple TCp between one or more temperature measurement zones and the distal block, wherein a thermoelement from one of the thermocouples and a thermoelement from another one of the thermocouples between the thermocouples TC2 and TCn is connected to each of the thermocouple junctions between the one or more temperature measurement zones and the distal block, wherein each of the n−1 thermocouple junctions is formed by a pair of compensated thermoelements, wherein each strand in a pair of compensated thermoelements extends from its respective thermocouple junction in the proximal block to a separate and independent terminal in the distal block, wherein a thermoelement from TC1 is connected to a terminal TRM3 in the proximal block, and wherein a thermoelement used to make the thermocouple junction TCn is connected to a terminal TRM4 in the proximal block;

a strand of a first thermoelement extends between terminal TRM3 and a terminal TRM5 in the distal block; and a strand of a second thermoelement extends between terminal TRM4 in the proximal block and a terminal TRMn in the distal block, wherein a circuit can be formed from each of the thermocouples TC1 and TC2 to TCn to terminals in the distal block, wherein the circuit comprises a pair of compensated thermoelements that form their respective thermocouple and extend from the respective thermocouple to separate terminals or thermocouples in the proximal block, and wherein the circuit further comprises a pair of uncompensated thermoelements that extend from said separate terminals or thermocouples in the proximal block to separate and independent terminals in the distal block.

Embodiment 11. A method for measuring temperature comprising the steps of:

employing the thermocouple assembly of embodiment 10;

measuring a temperature Td at the distal block;

measuring a voltage difference VD12 between terminals TRM1 and TRM2;

determining a temperature Tp at the proximal block using thermocouple TCp, the voltage difference VD12, the temperature Td at the distal block and information for converting the voltage difference VD12 to temperature for a Type56 thermocouple;

measuring a voltage difference VD15 between terminals TRM1 and TRM5;

determining a temperature difference T1*p* between temperatures T1 and Tp that corresponds to the voltage VD15 for a Type12 thermocouple, wherein there is no compensation between the strand of thermoelement TE5 that extends between terminals TRM3 and TRM5 and the strand of thermoelement TE5 that extends between the thermocouple TCp and the terminal TRM1;

determining the temperature T1 as the sum of the temperature difference T1*p* and temperature Tp;

determining a temperature TTJ at each of the thermocouple junctions between the one or more temperature measurement zones and the distal block;

determining a temperature difference TD for each of the measured temperatures T2 through Tn between the thermocouple junction for the measured temperature and a corresponding thermocouple junction between the one or more temperature measurement zones and the distal block; and determining or estimating a temperature for each of the measured temperatures T2 through Tn as the sum of the temperature difference TD for the measured temperature and the temperature TTJ at a corresponding thermocouple junction between the one or more temperature measurement zones and the distal block.

Embodiment 12. A thermocouple assembly comprising:

first and second thermocouples of the same type or different types;

thermocouple wires extending from the first and second thermocouples to a first block;

a third thermocouple in the first block, wherein a leg from each of the first and second thermocouples is connected to the third thermocouple, and wherein the other leg from each of the first and second thermocouples is connected to first and second separate and independent terminals, respectively, in the first block;

a second block;

first and second extension wires joined together at one end to form the third thermocouple and extending to separate and independent terminals in the second block, wherein the first and second extension wires do not have the same thermo-electric properties as the thermocouple wires;

third and fourth extension wires connecting the first and second terminals, respectively, in the first block to separate and independent terminals in the second block; and equipment operatively connected to the second block and/or to the terminals in the second block that is designed and configured to measure, determine and/or estimate a temperature at each of the first, second and third thermocouples.

Embodiment 13. The thermocouple assembly of embodiment 12, wherein the equipment is designed and configured to determine temperatures at the first and second blocks, wherein the temperature at the first thermocouple is determined using a voltage difference between the terminal in the second block that has the third extension wire and the terminal in the second block that has the first extension wire while no connections are made between the terminals in the second block that receive the second and fourth extension wires.

Embodiment 14. The thermocouple assembly of embodiment 13, wherein the temperature at the second thermocouple is determined using a voltage difference between the terminal in the second block that has the fourth extension wire and the terminal in the second block that has the third extension wire while no connections are made between the terminals in the second block that receive the first and third extension wires.

Embodiment 15. A thermocouple assembly comprising:

more than two thermocouples of the same type or different types for indicating desired temperatures, wherein said thermocouples are referred to as desired TCs;

thermocouple wires extending from the desired TCs to a first block;

a useful thermocouple (useful TC) in the first block for each pair of desired TCs, wherein a leg from each of the pair of desired TCs is connected to the useful TC, and wherein at least a leg each from two desired TCs are connected to first and second separate and independent terminals, respectively, in the first block;

a second block;

compensated extension wires joined together at one end to form each of the useful TCs, wherein the compensated extension wires extend to separate and independent terminals in the second block, wherein the compensated extension wire does not have the same thermoelectric properties as the thermocouple wires;

first and second extension wires connecting the first and second terminals, respectively, in the first block to separate and independent terminals in the second block; and equipment operatively connected to the second block and/or to the terminals in the second block that is designed and configured to measure, determine and/or estimate the desired temperatures and temperatures at the useful TCs, preferably where there is at least one fewer useful TC than desired TCs.

Embodiment 16. A thermocouple assembly comprising: thermocouples TC1 and TC2 for indicating temperatures T1 and T2, respectively, wherein TC1 is formed at a junction of thermoelements TE1 and TE2, wherein TC1 is a Type12 thermocouple, wherein TC2 is formed at a junction of thermoelements TE3 and TE4, wherein TC2 is a Type34 thermocouple;

proximal and distal isothermal blocks with respect to TC1 and TC2;

a thermocouple TC3 formed at a junction of thermoelements TE5 and TE6 and located in the proximal block, wherein thermocouple TC3 is a Type56 thermocouple, wherein thermoelements TE5 and TE6 terminate at terminals TRM1 and TRM2 in the distal block, respectively, wherein thermoelement TE2 from TC1 and thermoelement TE3 from TC2 are connected to thermocouple TC3, wherein thermoelement TE1 from TC1 and thermoelement TE4 from TC2 are connected to terminals TRM3 and TRM4 in the proximal block, respectively;

a strand of thermoelement TE5 extends between terminal TRM3 and a terminal TRM5 in the distal block; a strand of thermoelement TE6 extends between terminal TRM4 and a terminal TRM6 in the distal block; and equipment operatively connected to the distal block and/or to the terminals in the distal block that is designed and configured to measure, determine and/or estimate the temperatures T1 and T2, preferably where the thermocouple assembly is used for: measuring a temperature T4 at the distal block; measuring a voltage difference VD12 between terminals TRM1 and TRM2; determining a temperature T3 at the proximal block using thermocouple TC3, the voltage difference VD12, the temperature T4 at the distal block and information for converting the voltage difference VD12 to temperature for a Type56 thermocouple; measuring a voltage difference VD15 between terminals TRM1 and TRM5; determining a temperature difference T13 between the temperatures T1 and T3 that corresponds to the voltage difference VD15 for a Type12 thermocouple; determining the temperature T1 as the sum of the temperature difference T13 and the temperature T3; measuring a voltage difference VD26 between terminals TRM2 and TRM6; determining a temperature difference T23 between temperatures T2 and T3 that corresponds to the voltage difference VD26 for a Type34 thermocouple; and determining the temperature T2 as the sum of the temperature difference T23 and the temperature T3.

Embodiment 17. A method for changing a type of thermocouple in a thermocouple assembly having a type 1 thermocouple for determining a value for a temperature T, a type 1 measuring instrument and/or transmitter and type 1 thermoelements, extension wire and/or compensation cable extending between the type 1 thermocouple and the type 1 measuring instrument and/or transmitter, the method comprising the steps of: replacing the type 1 thermocouple with a type 2 thermocouple, wherein type 1 and type 2 thermocouples are different types of thermocouples; providing a thermocouple translator device TTD between the type 2 thermocouple and the type 1 measuring instrument and/or transmitter; extending type 2 thermoelements between the type 2 thermocouple and the TTD; measuring a voltage difference VD2 at the TTD between the type 2 thermoelements; determining or estimating the temperature T for the type 2 thermocouple; determining a voltage difference VD1 that correlates to the temperature T for a type 1 thermocouple using the TTD; and outputting the voltage difference VD1 to the type 1 thermoelements, extension wire and/or compensation cable, thereby inputting the voltage difference VD1 to the type 1 measuring instrument and/or transmitter so that the type 1 measuring instrument and/or transmitter can indicate the temperature T.

Embodiment 18. A method for obtaining additional temperature measurements in a temperature measurement zone, comprising the steps of: providing proximal and distal isothermal terminal blocks, wherein the proximal terminal block is between the zone and the distal block; extending y thermoelements between the proximal and distal terminal blocks, wherein half of the thermoelements are considered positive thermoelements and the other half are considered negative thermoelements; connecting each of the y thermoelements to a separate terminal in the outside terminal block; forming a reference thermocouple for the proximal terminal block using two of the thermoelements; connecting each of the remaining y−2 thermoelements to a separate terminal in the proximal terminal block; extending a positive thermoelement from a first terminal to a first thermocouple; extending a negative thermoelement from a last terminal to a last thermocouple; extending a negative thermoelement from the first thermocouple to the reference thermocouple; extending a positive thermoelement from the second thermocouple to the reference thermocouple; forming a first set of thermocouples by extending appropriate thermoelements from terminals in the proximal terminal block, wherein a circuit can be made for each of the first set of thermocouples using either a pair of positive thermoelements or a pair of negative thermoelements between the proximal and distal isothermal terminal blocks; forming a second set of thermocouples by extending appropriate thermoelements from terminals in the proximal terminal block, wherein a circuit can be made for each of the second set of thermocouples using a positive thermoelement and a negative thermoelement between the proximal and distal isothermal terminal blocks, wherein each of the terminals in the inside isothermal terminal block has two thermoelements connected to it other than the first and last terminals.

While the preferred embodiments of the invention have been illustrated in detail, it is apparent that modifications and adaptations of the preferred embodiments will occur to those skilled in the art. Such modifications and adaptations are in the spirit and scope of the invention as set forth in the following claims.

What is claimed is:

1. A thermocouple translator device (TTD) for use in a temperature measurement system comprising:

an enclosure;

first and second terminals on or in the enclosure, wherein the first and second terminals are configured to receive first and second thermoelements extending between a thermocouple and the enclosure;

third and fourth terminals on or in the enclosure, wherein the third and fourth terminals are configured to receive third and fourth thermoelements extending between a temperature measuring instrument and the enclosure;

a connector received on and/or in the enclosure, wherein the connector is configured for receiving power from a power source; and a digital and/or analog processor received on or in the container and operatively connected to the connector and to the first, second, third, and fourth terminals, wherein the processor is configured to:

measure a voltage difference (VD1) between the first and second terminals;

determine or estimate a temperature (T) for a type 1 thermocouple that correlates to the voltage difference (VD1);

determine or estimate a voltage difference (VD2) for a type 2 thermocouple for the temperature (T), wherein a type 2 thermocouple is not the same as the type 1 thermocouple; and output third and fourth voltages to the third and fourth terminals, respectively, wherein a difference in voltage between the third and fourth voltages is approximately equal to the voltage difference (VD2).

2. The TTD of claim 1, wherein the processor is configured for the type 1 thermocouple to be a type N thermocouple and for the type 2 thermocouple to be a type K thermocouple.

3. The TTD of claim 1, wherein the processor is configured for the type 1 thermocouple to be a type B, R or S thermocouple and for the type 2 thermocouple to be a type K or N thermocouple.

4. The TTD of claim 1, wherein the processor is configured for the type 1 thermocouple to be a length of cable having two different thermocouple wires separated by an insulator, wherein one of the thermocouple wires is positive and the thermocouple wire other is negative, wherein an end of the positive thermocouple wire is attached to the first terminal, wherein an end of the negative thermocouple wire is attached to the second terminal, and wherein the cable is configured to indicate a maximum temperature detected along its length.

5. The TTD of claim 1, wherein the enclosure is a box that can be opened and shut and sealed.

6. The TTD of claim 1, wherein the enclosure is a cylindrical container configured for receipt in a thermocouple head that has a cylindrical cavity.

7. The TTD of claim 1, wherein the enclosure is configured for receipt on a DIN rail.

8. The TTD of claim 1, further comprising an energy harvester for providing power.

9. The TTD of claim 1, further comprising a battery for providing power.

10. The TTD of claim 1, further comprising an analog-to-digital converter for receiving the voltage difference (VD1) and outputting a first signal to the processor and a digital-to-analog converter for receiving a second signal from the processor and outputting the voltage difference (VD2).

11. The TTD of claim 10, wherein the processor is configured for the type 1 thermocouple to be a length of cable having two different thermocouple wires separated by an insulator, wherein one of the thermocouple wires is positive and the thermocouple wire other is negative, wherein an end of the positive thermocouple wire is attached to the first terminal, wherein an end of the negative thermocouple wire is attached to the second terminal, and wherein the cable is configured to indicate a maximum temperature detected along its length.

12. The TTD of claim 1, wherein the processor is configured for a plurality of types of thermocouples.

13. The TTD of claim 12, further comprising a selector that allows a user to indicate a type of thermocouple wire attached to each of the terminals.

14. The TTD of claim 1, further comprising a solar panel for harvesting solar energy and for converting the solar energy to electrical energy for providing power.

15. The TTD of claim 14, further comprising a battery for storing energy.

* * * * *